(12) United States Patent
Hicks et al.

(10) Patent No.: US 11,412,710 B2
(45) Date of Patent: Aug. 16, 2022

(54) LIVESTOCK HANDLING APPARATUS

(71) Applicant: David James Hicks, Queensland (AU)

(72) Inventors: David James Hicks, Queensland (AU); Gerald James Hicks, Queensland (AU)

(73) Assignee: David James Hicks, Killarney (AU)

( * ) Notice: Subject to any disclaimer, the term of this patent is extended or adjusted under 35 U.S.C. 154(b) by 91 days.

(21) Appl. No.: 16/890,705

(22) Filed: Jun. 2, 2020

(65) Prior Publication Data

US 2020/0375150 A1    Dec. 3, 2020

(30) Foreign Application Priority Data

Jun. 3, 2019  (AU) .............................. 2019901896

(51) Int. Cl.
*A01K 15/04* (2006.01)
*A01K 1/00* (2006.01)

(52) U.S. Cl.
CPC ............ *A01K 15/04* (2013.01); *A01K 1/0017* (2013.01)

(58) Field of Classification Search
CPC .. A01K 1/0613; A01K 1/0005; A01K 1/0218; A01K 1/0029; A01K 1/0209; A01K 1/0017; A01L 13/00; A61D 3/00
See application file for complete search history.

(56) References Cited

U.S. PATENT DOCUMENTS

| | | | | |
|---|---|---|---|---|
| 3,220,687 A | * | 11/1965 | Baermann | A47C 3/22 |
| 3,276,433 A | * | 10/1966 | Tougas | A61D 3/00 |
| 5,163,383 A | * | 11/1992 | Roy | A61D 3/00 |
| | | | | 119/98 |
| 8,746,267 B2 | * | 6/2014 | Lovley | E04H 15/32 |
| | | | | 135/120.2 |
| 2008/0308047 A1 | * | 12/2008 | Mollhagen | A61D 3/00 |
| | | | | 119/734 |
| 2011/0079184 A1 | * | 4/2011 | Mollhagen | A61D 3/00 |
| | | | | 119/752 |
| 2018/0042200 A1 | * | 2/2018 | Gipson | A01K 1/06 |

* cited by examiner

*Primary Examiner* — Joshua E Rodden
*Assistant Examiner* — Henry Hooper Mudd
(74) *Attorney, Agent, or Firm* — Fay Sharpe LLP

(57) ABSTRACT

This invention relates in general to a confining and restraining apparatus for livestock to facilitate their handling. The apparatus has an animal receiving stall having a frame, a base and a means for rotatably mounting the frame on the base. The animal receiving stall has opposed, entrance and exit openings, an entrance gate assembly is located at the entrance opening and fixed to one end of the base. The exit gate assembly is located at the exit opening and attached at one end of the frame, the exit gate assembly having a pair of stanchions which are adapted to capture a neck of an animal therebetween. The means for rotatably mounting the frame to the base allows rotation of the frame in both clockwise and counter clockwise directions around a vertical axis to position an animal in a selected treatment position.

19 Claims, 27 Drawing Sheets

LIVESTOCK HANDLING APPARATUS

FIELD OF THE INVENTION

The invention relates in general to a confining and restraining apparatus for livestock to facilitate their handling. In particular, the present invention provides an apparatus for handling and restraining cattle especially for the purpose of veterinary operations and other inspection.

It will be convenient to hereinafter describe the invention in relation to an apparatus for efficiently handling cattle with complete safety for both the cattle and the operator and which provides essentially access to the animal's body while at the same time providing the necessary restraint on the animal and support therefor. It should be appreciated that the present invention is not limited to cattle only and can be used on a wide range of livestock such as sheep, goats, horses and pigs.

BACKGROUND OF THE INVENTION

It should be noted that reference to the prior art herein is not to be taken as an acknowledgement that such prior art constitutes common general knowledge in the art.

In the practice of livestock husbandry, it is necessary to restrain livestock in order to perform veterinary operations such as inoculations, castrations, ear marking and tagging, drenching, de-horning, branding, weighing and the like. In particular, calves which can range in age from couple of weeks old up to about five months old are branded, ear marked, castrated and vaccinated. The range in age of the calves also means there will be a big difference in the size of the animal from the oldest to the youngest calves. Such treatment often requires access to the animals' hindquarters and/or head by an operator while the animal is restrained. The effective restraint of livestock during these veterinary operations has always presented a problem for farmers and veterinarians. The animal must be securely restrained for the protection of the person performing the operations. At the same time, the restraining device must be constructed and used in a fashion which does not injure the animal.

Over time a number of different devices have been developed to restrain animals for the purposes of performing these operations. For example, cattlemen have used various methods of restraining calves from pure man handling with skill but mostly brute strength through to using various types of mechanical restraining devices from the conventional cattle crush to dedicated machines generally referred to as calf marking cradles. In the case of the conventional cattle crush, the calf's head is caught in the head bail, one assistant holds the calf against the side gate by pulling on the tail and the operator leans over the gate and works sideways to castrate the calf. A conventional cattle crush is designed for mature animals and a calf is too small for these devices, so it is difficult and sometimes dangerous to restrain the animal satisfactorily.

There are many different makes and models of calf marking cradles or crates which include simple crushes, chutes, clamping head gates, vise-like body clamps, and various combinations of these features. A cattle crush or squeeze chute is a strongly built stall or cage for holding livestock. Most crushes have been built using standard heavy steel pipe or oval tubing that is welded together. Typically the front end of the crush has a head bail or head gate that is often adjustable to accommodate animals of different sizes. A sliding entrance gate, operated from the side of the crush, is set just behind the captured animal to allow for clearance and prevent other animals entering.

Crushes vary in sophistication, according to requirements and cost. The simplest are just a part of a cattle race with a suitable head bail. More complex ones incorporate features such as automatic catching systems, hatches (to gain access to various parts of the animal), tilting or tipping cages (which allow access to the feet of the animal), constricting sides to hold the animal firmly or a weighing mechanism. A typical calf cradle includes some form of holding device usually steel bars located on the neck and in front of the stifle. Then the cradle is tipped 90°, exposing the underside of the calf to be branded or examined. Some tip over so that the calf is about 600 mm off the ground, some hinge and tip at just above ground level. When the calf enters the crush a hinged gate is pulled towards the calf, initially squeezing the calf against the near side solid panel. The entire device is rolled on an additional link to rotate the cage 90 degrees such that the cradle and animal are lying on a side. Typically in these devices the captured calf struggles a lot, throwing its head around and kicking. Ear marking and ear tagging are difficult and sometimes dangerous. A second operator is needed to grip the top hind leg and pull it back so that castration can take place. Once again the task is difficult and sometimes dangerous.

Another known type of calf crush is the scaled down version of the adult cattle crush. Generally about 400 mm wide and much shorter than the typical cattle crush. In the scaled down version, the calf is much more restrained, but to be big enough for the older and larger calves it is by definition too big for the smallest calf, and in all cases the operator has to lean over and attempt to work sideways. The bigger the calf the more difficult this becomes but is still awkward to operate and requires two operators.

One prior art method of restraining animals involves moving one or both sides of the chute frame inwardly whereby the animal therein is pinioned. Such livestock chutes may be referred to as "squeeze" chutes. These devices can be manually operated or may utilize a hydraulic system for moving side members against or away from livestock. However, the hydraulic system and manually operated system of levers for actuating the sides of the devices are relatively complex and thus contribute significantly to the costs of these chutes. Typically, squeeze chutes are usually provided with sides that pivot inwardly about their bottom ends in order to squeeze livestock. It is difficult for larger animals to enter or be driven into the chute because its width at the bottom is barely sufficient to accommodate the animal. In addition, the manner in which the sides pivot tends to shock or excite the animal and often causes the animal to lose its balance.

A disadvantage with many prior art animal handling devices is that livestock can be hazardous to workers trying to direct and control them with such equipment. Animals that are unaccustomed to confinement frequently balk at entering confining structures and may even panic and inevitably the animal will struggle and kick its hind legs when loaded into these devices. This is especially dangerous to farmers or operators who are performing veterinary tasks in the vicinity of the rear quarters of an animal. Often when such tasks are performed an animal will kick violently. This presents a very serious risk of injury to the operators. A typical solution is to slide a member such as a bar through the structure of the chute directly behind the animal's hind legs in order to prevent kicking. However, even this solution presents risks to the operator and the animal if the animal is kicking when the board or bar is inserted through the chute.

During particular treatment operations, the head of the animal must be firmly held in place to avoid injury to both the animal and the operator. For example, the application of ear tags, implants or other medicaments in the animal's ear is accomplished more safely if the animal's head is substantially immobilized. The same is true during the examination of the animal's eyes, ears and teeth. Nearly all of the methods of immobilizing the animals head include use of a stanchion either fixed or formed as a part of a head bail. The animal is held in the stanchion to keep its body confined. They are operated by manually operated levers located beside the head bail or in close proximity to the front of the livestock restraining device.

Prior art squeeze chute and crush designs typically limit the operator's ability to safely enter the rearward end of the chute, behind the animal, without compromising the physical restraint of the animal. Most devices have a sliding entrance gate at the rear of the device which closes off and prevents access to the rear end of the animal. Typically the operator must reach in from the side of the crush through a drop-down gate or the like to gain access to the rear of the animal. If the operator is able to enter the chute behind the animal, simple animal husbandry operations are made difficult if not dangerous.

Prior efforts to combine the above features into a single system have resulted in complex devices which are not easily operated, which can include a considerable array of control levers, often inconveniently located on several sides of the device, and which can require multiple operators for their effective use.

Clearly it would be advantageous if a confining and restraining apparatus for livestock to facilitate their handling could be devised that helped to at least ameliorate some of the shortcomings described above. In particular, it would be beneficial to provide an apparatus for efficiently handling cattle of all sizes with complete safety for both the cattle and that is able to be utilized by a single operator and which provides essentially access to the animal's body while at the same time providing the necessary restraint on the animal and support therefor or at least provide the public with a useful choice.

SUMMARY OF THE INVENTION

The present invention has been developed to provide a livestock handling apparatus for confining and restraining livestock to facilitate their treatment.

In accordance with a first aspect, the present invention provides a livestock handling apparatus for confining and restraining livestock to facilitate their treatment, the apparatus comprising: an animal-receiving stall having a frame, a base and a means for rotatably mounting the frame on the base, the animal receiving stall having opposed, entrance and exit openings; an entrance gate assembly located at the entrance opening and fixed to one end of the base; an exit gate assembly located at the exit opening and attached at one end of the frame, the exit gate assembly having a pair of stanchions which are adapted to capture a neck of an animal therebetween; and wherein the means for rotatably mounting the frame to the base allows rotation of the frame in both clockwise and counter clockwise directions around a vertical axis to position an animal in a selected treatment position.

Preferably, the frame may comprise normally upright members mounted on a support member, the support member forming a planar floor allowing the animal to stand on the floor when received therein. The upright members may comprise a first side spaced apart from a second side, the first and second sides having a plurality of horizontally disposed first and second elongate members. The second elongate members may be slideably received within the first elongate members and moveable between extended and retracted positions. One or both of the first or second side second elongate members may be retracted to allow a user access to a rear of the animal within the animal receiving stall.

Preferably, at least one of the second elongate members may comprise a release mechanism for securing the second elongate members in the extended position.

Preferably, the means for rotatably mounting the frame on the base may comprises: a first platform mounted on the base and having a planar top surface with a central aperture therein; a shaft vertically mounted on the base and extending through the central aperture in the first platform; and a turntable mounted on an underside of the support member of the frame, the turntable having an aperture for receiving the vertically mounted shaft to allow the frame to be rotatably mounted on the base.

Preferably, the shaft may be a threaded axle vertically mounted to the base, and the turntable is rotatably mounted above the first platform for rotation about the shaft.

Preferably, the turntable may be rotatably supported above the first platform by means of at least one pair of support wheels rotatably mounted on the first platform, each pair of support wheels being located on collinear axes extending from opposite sides of the shaft. Each support wheel may be mounted for rotation within a longitudinal channel in the planar top surface of the first platform, each longitudinal channel being located around the periphery of the first platform, each support wheel projects above and below the planar top surface of the first platform and an outer surface of the support wheel contacts the turntable.

Alternatively, the turntable may be rotatably mounted above the first platform by means of three pairs of support wheels, each pair of support wheels being located on collinear axes extending from opposite sides of the shaft. Each support wheel may be mounted for rotation within a longitudinal channel in the planar top surface of the first platform, each longitudinal channel being located around the periphery of the first platform. Each support wheel may project above and below the planar top surface of the first platform and an outer surface of the support wheel contacts the turntable.

Preferably, each support wheel may consist of a roller supported by an axle, the axle being connected on opposing sides of the longitudinal channel to the first platform. The support wheels may be rotatably mounted within the first platform and positioned to be located between the first platform and the turntable for guiding movement of the frame during rotation around the vertical axis.

Preferably, the support wheels may be castors, rollers, or roller bearings.

Preferably, the livestock handling apparatus may further comprise a first locking mechanism for securing the frame and the base in a position to allow the animal to enter or leave the animal receiving stall. The first locking mechanism may comprise: a locking bar having a first end pivotally attached to the base; a pair of locking gates, each locking gate having a first end and a spaced apart second end, the first end of each gate is pivotally mounted to a bottom surface of the frame support member; and a remote operating mechanism for releasing the locking bar from between a recess formed between opposing second ends of the locking gates, the remote operating mechanism being connected to a second end of the locking bar.

Preferably, the locking bar may have a locking tab extending upwardly from a surface of the locking bar, the locking tab being located between the recess formed at opposing ends of the locking gates for securing the frame and the base in the position to allow the animal to enter or leave the animal receiving stall.

Preferably, the remote operating mechanism may comprise a latch assembly attached adjacent an upper corner of the entrance gate and a foot pedal attached adjacent a lower corner of the entrance gate with both attached to the locking bar by an activation rod. When the latch assembly or the foot pedal may be remotely activated or placed in a lowered position the activation rod extends vertically downward to rotate the locking bar about the first end pivot and the locking tab is pivoted away from the recess between the locking gates to allow the frame to be rotated on the base. To return the frame and the base to the position to allow the animal to enter or leave the animal receiving stall, the latch assembly or the foot pedal may be raised and the activation rod is vertically raised to allow the locking tab to be relocated between the recess formed at opposing ends of the locking gates, wherein as the frame is rotated a top surface of the locking tab engages with a bottom surface on one of the pair of locking gates and rotates the locking gate about the first end pivot until the locking tab is relocated within the recess between the opposing ends of the locking gates to lock the frame to the base.

Preferably, the turntable may comprise a first recess and a second recess located on diametrically opposite sides on an outer edge of the turntable, and the base comprises an engaging mechanism which engages one of the first or second recesses in the turntable to enable the frame to be positioned in and movable between one of two selected treatment positions.

Preferably, the engaging mechanism may comprise a recess engaging wheel and a tensioning device, the recess engaging wheel releasably engages the first or second recess to arrest rotation of the frame on the base and the tensioning device applies a force to the recess engaging wheel to maintain the wheel within the first or second recess, and a lateral force applied to the frame of the apparatus will allow the frame to rotate around the vertical axis and allow the recess engaging wheel to be released from the first or second recess. The tensioning device may be a spring.

Preferably, the exit gate assembly may further comprise a head gate with a pair of side-by-side stanchion posts with an operating mechanism connecting the stanchions to an operating shaft, and an operating handle in communication with the operating shaft, to open and close the pair of stanchions, the operating shaft is a longitudinally extending tubular member with at least one activating cam mounted on an outer surface of the operating shaft.

Preferably, upon rotation of the operating shaft by a user moving the operating handle, the at least one activating cam may be positioned to contact an associated activating member.

Alternatively, the exit gate assembly may further comprise a head gate, the head gate comprising: a pair of side-by-side stanchion posts each having opposed, upper and lower ends; and means mounting the posts for movement inwardly toward each other to capture the neck of an animal therebetween, and outwardly away from each other to release the restrained animal. Preferably, when the stanchion posts are moved inwardly to capture the neck of the animal, a gap slightly wider than the neck of the animal but narrower than the head or shoulders of the animal may be provided between opposing stanchion posts, wherein in use the gap receives the animal's neck, thereby restraining the animal within the exit gate assembly. Preferably, the means mounting the posts for movement may comprise: an operating mechanism connecting the stanchions to an operating shaft; and an operating handle in communication with the operating shaft, to open and close the pair of stanchions. The operating shaft may be a longitudinally extending tubular member with a plurality of spaced apart activating cams mounted on an outer surface of the operating shaft. Preferably, upon rotation of the operating shaft by a user moving the operating handle, each activating cam may be positioned to contact an associated activating member.

Preferably, the animal receiving stall may further comprise a pair of lateral restraining assemblies, one of the pair of lateral restraining assemblies is located at or adjacent each of the first and the second sides of the upright members of the frame and located between the entrance and exit openings, the assemblies being supported for movement relative to the frame so as to be movable towards and away from one another for constraining the animal laterally.

Preferably, the pair of lateral restraining assemblies may comprise a first end pivotally connected to an upright frame member and located adjacent the exit opening and a second free end connected to a control mechanism, wherein upon activation by a control lever, the free ends move towards the animal to be restrained, and are adapted to contact adjacent an animals ribs to assist in immobilizing the animal within the frame.

Preferably, the control lever may be mounted to be movable within a linear ratchet mechanism, the control lever is adapted to allow each free end of the pair of lateral restraining assemblies to move from a first position adjacent the first and second sides of the upright members of the frame to one of a second position retained against the animals ribs, the position of the control lever within the linear ratchet mechanism allows the free ends of the lateral restraining assemblies to be positioned to accommodate different sized animals in the frame.

Preferably, each position of the control lever in linear ratchet mechanism may prevent movement of the lateral restraining assemblies away from the animal once the lateral restraining assemblies are in contact against the ribs of the animal.

Preferably, upon rotation of the operating shaft by a user moving the operating handle of the exit gate assembly, the at least one activating cam on the outer surface of the operating shaft may be positioned to contact the control lever to disengage the control lever from the linear ratchet mechanism to release the lateral restraining assemblies from the animal and return each free end of the pair of lateral restraining assemblies to the first position adjacent the first and second sides of the upright members of the frame.

Alternatively, each free end of the pair of lateral restraining assemblies may be retained against the animal's ribs under spring tension, the spring tension allows the lateral restraining assemblies to move to accommodate different sized animals in the frame.

Preferably, the apparatus may further comprise a pair of kick gates, each kick gate is located at or adjacent a lower rear end of each of the first and the second sides of the upright members of the frame, the kick gates are attached to a rotating vertical column and movable between an open position and a closed position, when in the closed position the kick gates protect the user from being kicked by the animal.

Preferably, the apparatus may further comprise a rotation activated mechanism connected to each rotating vertical column.

Preferably, the rotation activated mechanism may comprise: a central activating carriage having a first end spaced apart from a second end, the central activating carriage mounted for lateral movement along a first side of a pair of rails, wherein the pair of rails are mounted to the frame support member and spaced apart to form a slot between the rails; a roller connected to the first end of the central activating carriage and located on a second side of the pair of rails, wherein the roller is connected to the central activating carriage through the slot formed between the rails; a pair of link assemblies having a first end connected to each rotating vertical column and a second end connected to the second end of the central activating carriage; and wherein when the lateral force is applied to the frame, rotation of the frame around the vertical axis engages the roller into contact with an edge surface of the first platform on the base of the apparatus, the first platform having a shape which moves the roller and the central activating carriage laterally along the rails to drive the link assemblies and the rotating vertical column to close the kick gates.

Preferably, the pair of link assemblies may further comprise a return spring for biasing the rotation activated mechanism to a first position when the frame has been positioned on the base to allow the kick gates to open and the animal to enter or leave the animal receiving stall.

Preferably, the entrance gate may comprise a frame and a pair of side-by-side stanchion posts each having opposed, upper and lower ends, the pair of stanchions being vertically operable within tracks mounted on the entrance gate frame.

Preferably, the operating handle of the exit gate assembly, an operating handle for the entrance gate, the remote operating mechanism of the first locking mechanism and the control lever for the pair of lateral restraining assemblies may be remotely operable by a plurality of remote operating devices from a location in close proximity to one side of the frame to permit manipulation of the gates and rotation of the frame by a single operator from the location.

Preferably, a height of the floor of the frame may be located approximately 250 mm above the ground on which the base is supported, the height of the floor providing a suitable work height for an operator.

Preferably, the livestock to be confined and restrained may be any one of cattle, a horse, a sheep, a goat, a pig or any other form of livestock. Alternatively, the livestock may be calves.

Preferably, the selected treatment positions which the frame is movable between may comprise a first treatment position which allows an operator to perform any task associated with the rear or the animal and a second treatment position which allows the operator to perform any task associated with the front or head of the animal.

Preferably, the rotation of the animal receiving frame may allow the operator to perform veterinary operations in both the first and second treatment positions from one side of the livestock handling apparatus.

Alternatively, two operators may perform veterinary operations in both the first and second treatment positions simultaneously by locating each operator on opposing sides of the livestock handling apparatus.

Preferably, the floor of the animal-receiving frame may further comprise a loading surface and an unloading surface adapted to permit ingress and egress of the livestock onto and off of the rotatable frame of the livestock handling apparatus.

In accordance with a further aspect, the present invention provides a method of treating livestock, said method comprising the steps of: a) providing a livestock handling apparatus having an animal-receiving stall, the animal receiving stall having a frame, a base and a means for rotatably mounting the frame on the base, the animal receiving stall having opposed, entrance and exit openings, an entrance gate assembly located at the entrance opening and fixed to one end of the base, an exit gate assembly located at the exit opening and attached at one end of the frame, the exit gate assembly having a pair of stanchions which are adapted to capture a neck of an animal therebetween, and a pair of lateral restraining assemblies with a first end pivotally connected to an upright frame member and located adjacent the exit gate assembly and a second free end connected to a control lever mounted to be movable within a linear ratchet mechanism, the position of the control lever in the linear ratchet mechanism controls the position of the lateral restraining assemblies; b) opening the entrance gate to load the livestock into the animal receiving frame and then closing the entrance gate; c) opening the exit gate to allow a head of the livestock to pass through the pair of stanchions and closing the exit gate to capture the neck of the animal therebetween; d) moving the control lever to position the lateral restraining assemblies to contact adjacent an animals ribs to assist in immobilizing the animal within the frame; e) releasing a first locking mechanism to allow the frame to rotate clockwise around a vertical axis from a starting position to a first treatment position; f) performing a veterinary operation at the first treatment position, wherein the first treatment position allows an operator to perform any veterinary operation associated with the rear of the animal; g) rotating the animal-receiving frame anti-clockwise to a second treatment position; h) performing a further veterinary operation at the second treatment position, wherein the second treatment position allows the operator to perform any veterinary operation associated with the front or head of the animal; i) resetting the first locking mechanism so that as the frame is rotated clockwise back to the starting position the first locking mechanism will secure the frame in the starting position; and j) opening the exit gate to release the control lever from the linear ratchet mechanism and allow the animal to leave the animal receiving stall.

Preferably, step e) may further comprise activating a rotation activated mechanism as the frame is rotated, wherein the rotation activated mechanism moves a pair of kick gates to close behind the animals hind legs to protect the operator from the animal kicking out.

Preferably, the method of treating livestock and the livestock handling apparatus may comprises any one of the features of the first aspect.

Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

DETAILED DESCRIPTION OF THE INVENTION

Figure 1:
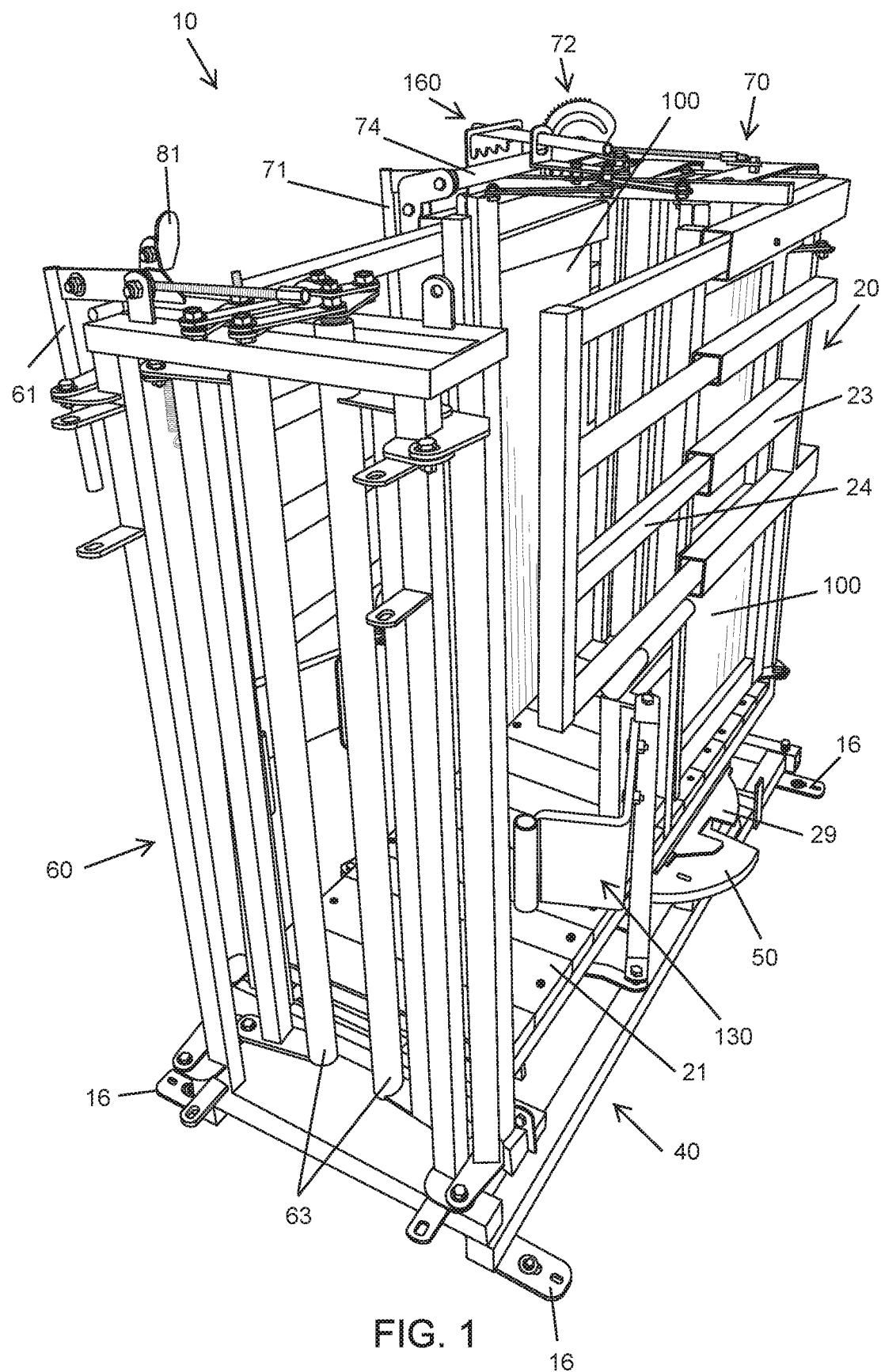
FIG. 1 shows a perspective view from the entrance gate end of the livestock handling apparatus in accordance with an embodiment of the present invention.

The following description, given by way of example only, is described in order to provide a more precise understanding of the subject matter of a preferred embodiment or embodiments.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Reference will now be made to the drawings in which the various elements of embodiments will be given numerical designations and in which embodiments will be discussed so as to enable one skilled in the art to make and use the invention. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand. Specific reference to components, process steps, and other elements are not intended to be limiting. Further, it is understood that like parts bear the same reference numerals, when referring to alternate figures and different embodiments.

The present invention in a broadest form provides a livestock handling apparatus 10 for confining and restraining livestock to facilitate their handling by a single operator. The apparatus 10 comprises an animal receiving stall with a frame 20 having a platform or floor 21, a base 40 and a means for rotatably mounting the frame 20 on the base 40. The animal receiving stall has opposed, entrance and exit openings. An entrance gate 60 is located at the entrance opening and fixed to one end of the base 40. An exit gate 70 located at the exit opening is attached at one end of the frame 20, the exit gate 70 having a pair of stanchions 73 which are adapted to capture the neck of an animal therebetween. The means for rotatably mounting the frame 20 to the base 40 allows rotation of the frame 20 around a vertical axis 15 to orient the frame 20 so as to position the animal in a selected treatment position. The frame 20 is able to rotate in both clockwise and anti-clockwise directions to allow an animal to be treated by one operator located on one side of the apparatus 10.

Livestock is taken to mean any animal that has been raised in an agricultural setting to produce labor and commodities such as meat, milk, fur, leather, and wool. By way of example only and in no way limiting the scope of the present invention, livestock is taken to include cattle, pigs, goats and sheep. In particular, the present invention has been found to be particularly useful in the restraining and handling of calves. A calf is a young bovine animal, especially a domestic cow or bull in its first year. In most temperate climate areas cows run in large paddocks and calve unassisted. Typically, the calves are mustered when the oldest calves are around five months old. The calves are mustered to perform veterinary operations such as inoculations, castrations, ear marking and tagging, drenching, de-horning, branding, weighing and the like. At this time calves can range in age from a few weeks old up to five months old and as such will vary considerably in both size and weight.

Each of the above mentioned veterinary operations require access to either the front or head of the calf or the rear or tail end of the animal. The present invention has been developed in order to provide an efficient way for a single operator to perform these tasks from the one side or single position without having to re-position themselves at opposite ends of the animal. The rotating frame 20 allows an operator to approach from directly behind the animal and therefore unlike the known devices does not have to work sideways. The frame can then be simply rotated around the vertical axis 15 to allow the operator access to the head of the animal without the operator having to move. Alternatively, if speed of operation is required two operators can be positioned on opposite sides of the apparatus 10 to allow both ends of the animal to be treated simultaneously.

The design of the present invention provides a livestock handling apparatus 10 which has been constructed to handle the type and size of calves noted above. The handling apparatus 10 has no obstructions, nip or crush points and is simple to operate and relatively quiet. The livestock handling apparatus provides a cradle which presents the calf at a level that minimizes the amount of bending and forward reaching by the operator. The present invention provides a cradle which secures the animal to minimize the potential of an operator being kicked or struck.

FIGS. 1 to 8 illustrate a crush or chute 10 suitable for handling and restraining a calf. The crush 10 comprises a base 40 which has an entrance gate 60 mounted to one end of the base 40 and a frame 20 rotatably mounted on the base 40. The entrance gate 60 has a gate frame 64 which is fixed at one end of the base 40. The entrance gate 60 has a pair of moveable stanchions 63 which are operated to move between open and closed positions by an entrance gate operating handle 61 connected by a shaft 66 to the associated operating mechanism 62. The stanchions 63 are pivotally mounted to the frame 64 at mounting brackets 65 positioned at the top and bottom of the stanchions 63.

The rotating frame 20 has a platform or floor 21 to which at one end of the floor 21 an exit gate 70 is mounted at the exit opening. The exit gate 70 has a pair of head gates or stanchions 73 pivotally mounted at the top to the frame 20 and at the bottom to an underside of the support frame 27 of the frame 20. A ratchet locking mechanism 72 is connected by operating shaft 74 to the top of the gate 70 to open and close the gate 70. The ratchet locking mechanism 72 connects the exit gate handle 71 by the rotating shaft 74.

As the frame 20 is rotated around the base 40 the exit gate 70 rotates with the frame 20 and the entrance gate 60 remains stationary and fixed on the base 40. The following description mostly refers to only one side of the frame, however, it should be understood that the present invention is a frame 20 that is substantially identical on both sides. The frame floor 21 and support frame 27 is used to support the livestock within the frame 20. The floor 21 should form a hard, non-slip surface and be easy to clean and provides adequate drainage for the apparatus 10. The frame 20 is formed with a number of upright frames 22 and a plurality of horizontal frame members 23, 24 forming the sides of the frame 20. The frame 20 is substantially open at the top and closed by the floor 21 at the bottom of the frame 20. The horizontal frame members 23, 24 form a fixed section 23 and a moveable section 24. The moveable section 24 is formed as a sliding gate which in the retracted position is received within the hollow fixed members 23. To retain the moveable section 24 within the fixed members 23, the end of the top horizontal moveable member 24 has an enlarged plate 26 fixed thereto. When the moveable sections 24 are first slid into the fixed member 23 a locking tab is screwed in to an aperture in the top horizontal fixed member 23 which abuts against the plate 26 to prevent the moveable sections 24 from being pulled all of the way out of the fixed members 23.

Alternatively, to lock the gate and horizontal members 24 in the open or extended position as shown in FIGS. 1 to 5 a latch mechanism (not shown) is pivotally fixed to one of the members 24. The latch mechanism handle is positioned adjacent the vertical frame member 28 which is located on the free end of the horizontal members 24.

Figure 3:
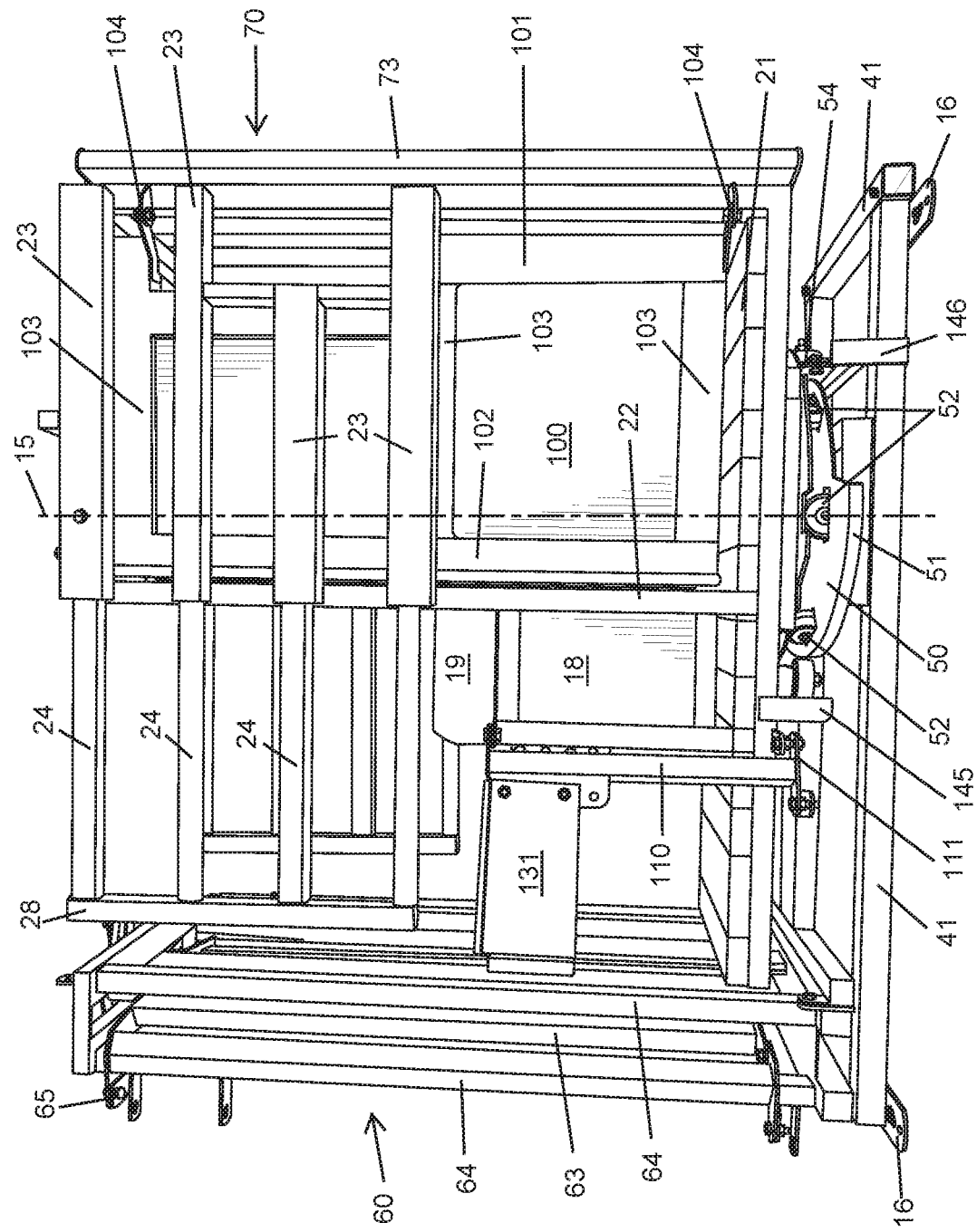
FIGS. 3 to 5 show side and top views of the livestock handling apparatus of FIG. 1.
Figure 4:
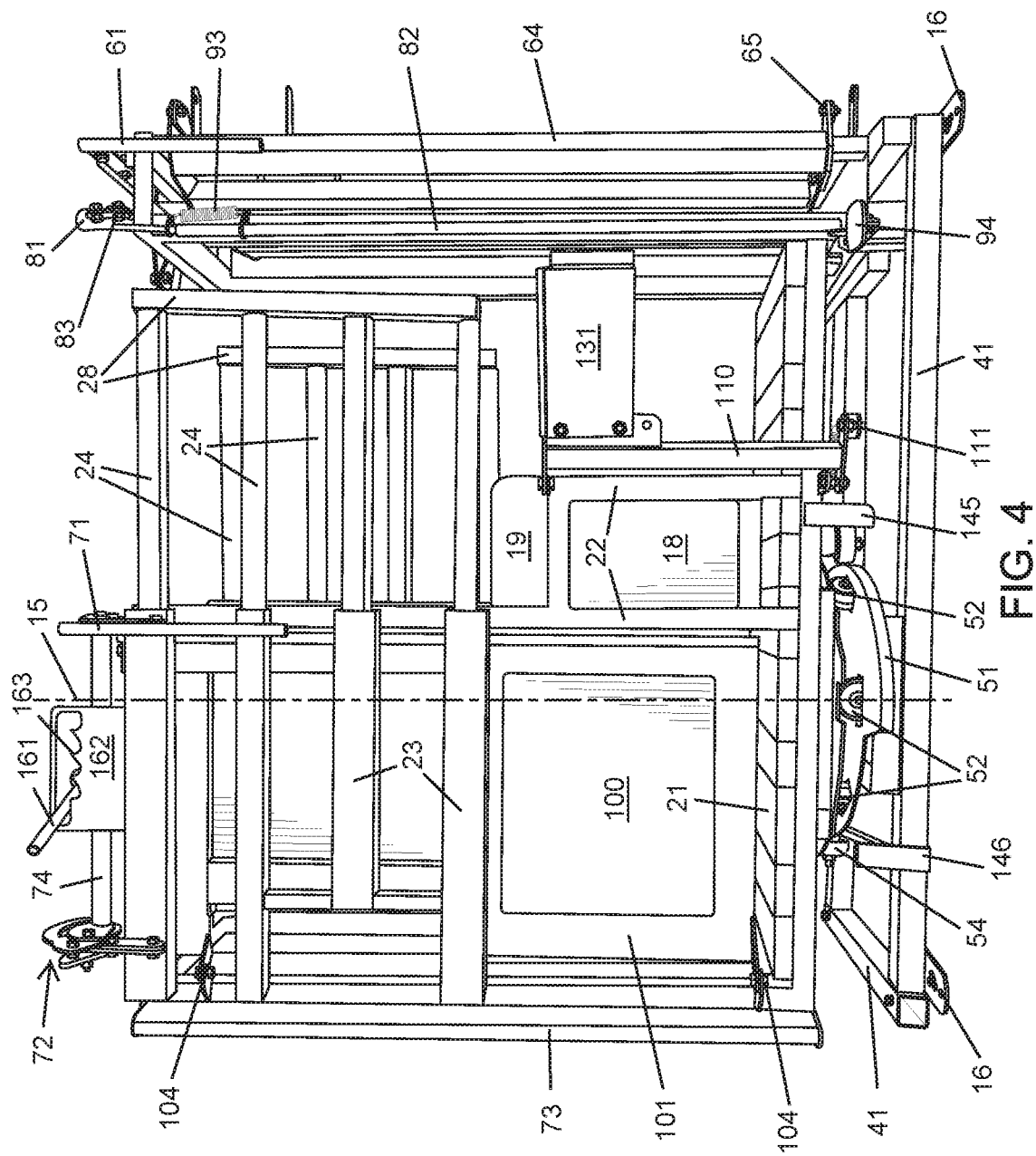

The frame 20 has a turntable 29 which is mounted above and in contact with the planar platform 50 on the base 40. The turntable 29 is supported for rotation on the platform 50 by the rollers 52 mounted within cut-outs or apertures 49 located within the planar platform 50. The frame 20 rotates around the base and about a vertical axis 15 extending perpendicular to the base 40. The planar platform 50 also has an edge 51 around which a roller 121 which forms part of the rotation activated mechanism 120 is guided during rotation of the frame 20. The rotation activated mechanism 120 is mounted to the bottom side of the frame 27 and will be described in further detail below. The platform 50 is mounted on the base support frame 41 which also has the entrance gate 60 mounted at one end. The turntable 29 has a pair of diametrically opposite recesses 31 which are adapted to receive the detent wheel 54 which releasably positions the frame 20 in one of two treatment positions. The base 40 and frame also have corresponding stops 145, 146 which are designed to further arrest the motion of the frame 20 when it is rotated to one of two treatment positions on the base 40. As illustrated in FIGS. 3 and 4, pairs of stops 145, 146 are located on opposing sides of the apparatus 10 so that as the frame 20 is rotated in the clockwise or anti-clockwise directions the stops 145, 146 will engage to further arrest the motion of the frame 20 on the base 40. The stops 145, 146 are necessary as the detent wheel 54 when located in one of the recesses 31 is sometimes not sufficient to stop the rotation of the frame 20, especially if the lateral force applied to rotate the frame 20 was significant.

The frame 20 also has vertical members 22 which mount the horizontal members 23, 24 to the floor frame 27 of the frame 20. Also attached between two of the vertical members 22 are panels 18 with the angled rest members 19 mounted on a top surface thereto. Typically the panels 18 are a steel enclosed panel, such as stainless steel tread plate. Also pivotally attached between one of these vertical members 22 and the floor frame 27 is the pivoting column 110 and link assembly 111.

As illustrated in FIGS. 1 to 5, the crush 10, with the base 40 and the rotatable frame 20 are shown in the neutral position where an animal can be loaded or unloaded from the crush 10. In this position the frame 20 is locked in place on the base 20 by the locking mechanism 80. The locking mechanism 80 is locked and released by latch release 81 located and pivotally mounted on top of the entrance gate frame 64 or by the foot pedal 94 located and pivotally mounted on the bottom and adjacent the entrance gate frame 64. The latch release 81 is attached to the locking bar 85 by the activating rod 82. Rotation of the latch release 81 downward pushes the activating rod 82 vertically towards the base 40 which in turn pushes the pivotally mounted locking bar 85 and the locking tab 84 away from the recess 89 formed between opposing ends of the locking gates 88 which are mounted on the underside of the floor frame 27. The bottom end of the activating rod 82 is attached to the locking bar 85 by the activating shaft connector 87 which is attached to a top surface of the locking bar 85. Also attached directly to the bottom of the activating rod 82 and the activating shaft connector 87 is the foot pedal 94. Activation of the foot pedal 94 has the same result as the latch release 81 on the locking bar 85.

The frame 20 has a number of devices 100, 130 attached thereto to either support the animal within the frame 20 or protect the operator while performing the veterinary operations on the animal.

The first of these devices is a pair of lateral squeeze gates 100 located on opposing sides of the frame 20. The lateral gates 100 are designed to squeeze on the flank or ribs of the calf to reduce the lateral movement of the calf within the frame 20 and assist with immobilizing the calf whilst in the apparatus 10. Each lateral squeeze gate 100 extends substantially from the bottom to the top of the frame 20. Each lateral squeeze gate 100 is attached to an upright frame member 22 located towards the exit gate end 70 of the frame 20 by hinges 104. Each squeeze gate 100 is formed by vertical members 101 attached between the hinged front ends 104 and horizontal frame members 103 extending from the vertical frame member 101 to the free end 102 to form each lateral squeeze gate 100. The vertical and horizontal members 101, 103 are enclosed by a flat panel to form each squeeze gate 100. The flat panel is typically any steel panel such as stainless steel tread plate.

The opposing end 102 of each lateral squeeze gate 100 is free and when activated by the lateral gate operating mechanism 160 the free end 102 moves inwardly to engage with the flank or ribs of the animal. In order to accommodate for the different sized animals the free end 102 of the lateral squeeze gates 100 can be moved by the position of the operating handle 161 within the linear ratchet mechanism 162, 163 to adjust according to the size of the animal. The lateral squeeze gates 100 are latched in position by the linear ratchet mechanism 162, 163 to maintain contact with the flank or ribs of the animal until the frame 20 is rotated back to the neutral position and the opening of the exit gate 70 automatically operates a release cam 167 which raises the operating lever 161 from the linear ratchet mechanism 162, 163 and swings the lateral squeeze gates 100 away from the animal. The cam 167 is mounted on the rotating operating shaft 74 of the exit gate assembly 70.

The second of these devices is the kick gate assembly 130 located towards the entrance gate end of the frame 20. The kick gate assembly 130 consists of two kick gates 131 which are pivotally mounted on opposite sides of the frame 20. The kick gates 131 are an additional safety gate which closes behind the calf's hind legs to protect the operator from being kicked. The kick gates 131 are essential for providing access for the operator to the rear end of the animal for procedures such as rectal examinations and castration. The kick gates 131 are attached to the activating column 110 which as the frame 20 is rotated the kick gates 131 will move from an open to the closed position behind the animal's hind legs. The kick gates 131 remain in the closed position behind the animal's hind legs until the frame 20 is rotated back to the neutral position and the activating column 110 connected by links to the rotation activated mechanism 120 which automatically opens the kick gates 131.

Figure 2:
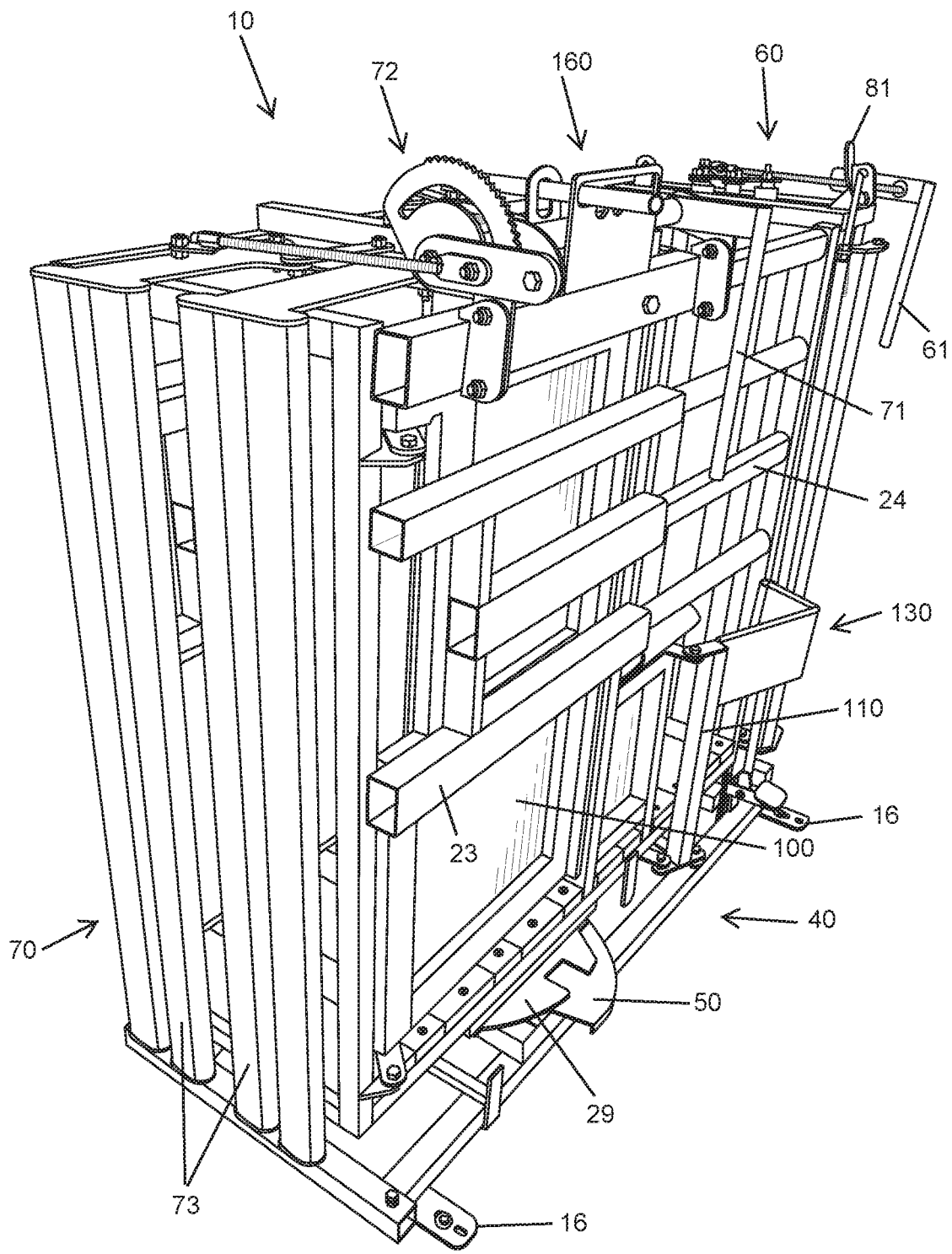
FIG. 2 shows a perspective view from the exit gate end of the livestock handling apparatus in accordance with an embodiment of the present invention.

FIG. 2 illustrates the four horizontal frame members 23 which are hollow to allow the four horizontal frame members 24 to be slideably received therein. The frame members 24 form a sliding gate on opposing sides of the frame 20. In use, one or both sliding gates can be extended and/or retracted, when retracted the sliding members 24 are located substantially within the hollow members 23.

Figure 5:
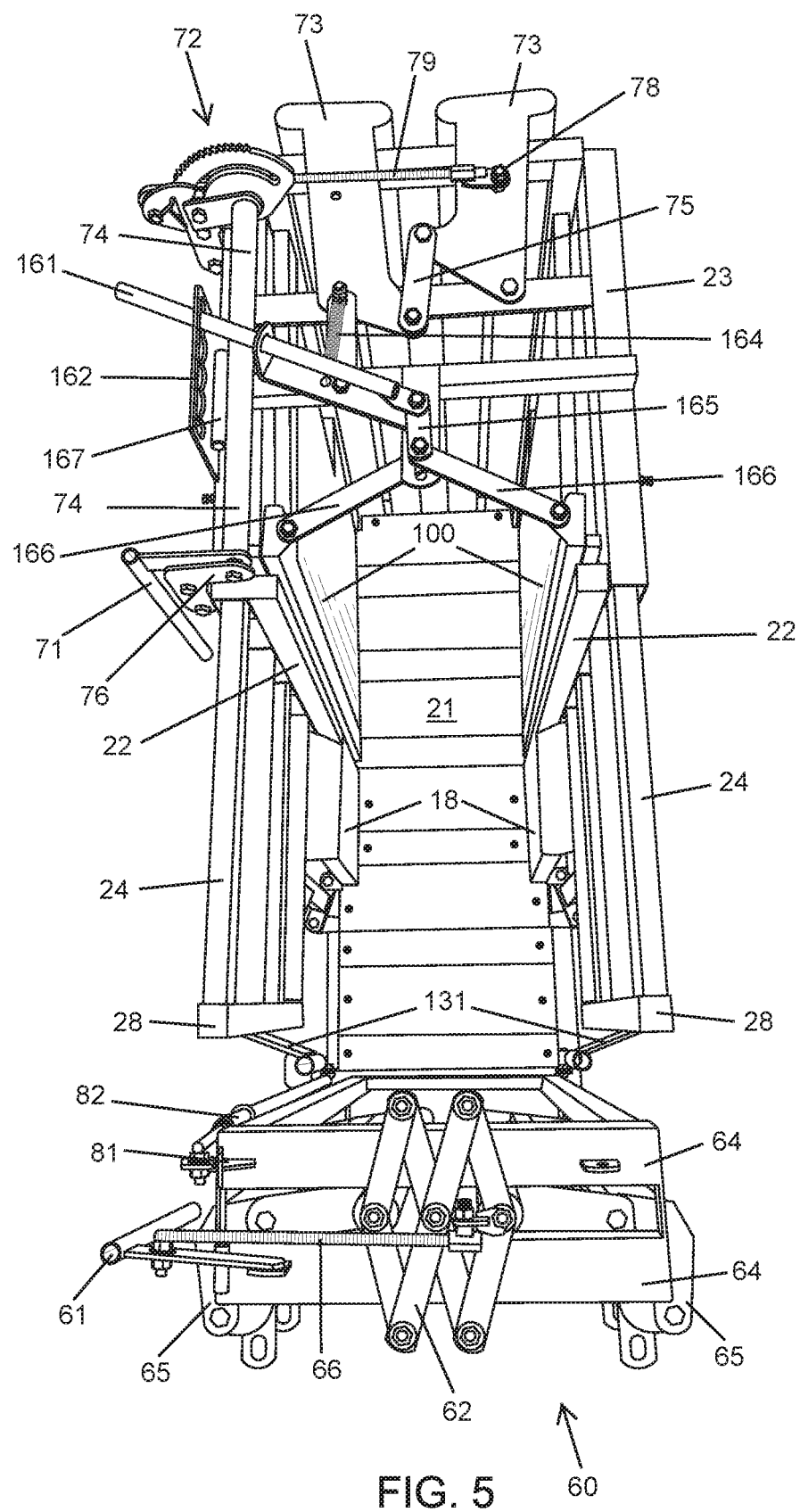

FIG. 5 illustrates a top view of the apparatus 10 in the neutral or start position. The base 40 is attached to the frame 20 by a vertical mounted shaft or threaded axle 46 and secured in place by lock nut 48 (see FIG. 15a) which maintains the bottom of the turntable 29 in contact with the rollers 52 which are rotatably mounted on the planar platform 50 of the base 40.

FIG. 5 also illustrates the lateral gate operating mechanism 160 which has an operating handle 161 moveable within the linear ratchet mechanism, 162, 163 and attached to the top corner of the lateral squeeze gates 100 by links 165, 166. A return spring 164 attached to the operating lever or handle 161 so that when the exit gate 70 is opened by the operating handle 71 a cam 167 attached to the rotating shaft 74 will raise the operating lever 161 and the spring 164 will return the squeeze gates 100 to the open position.

Figure 6:
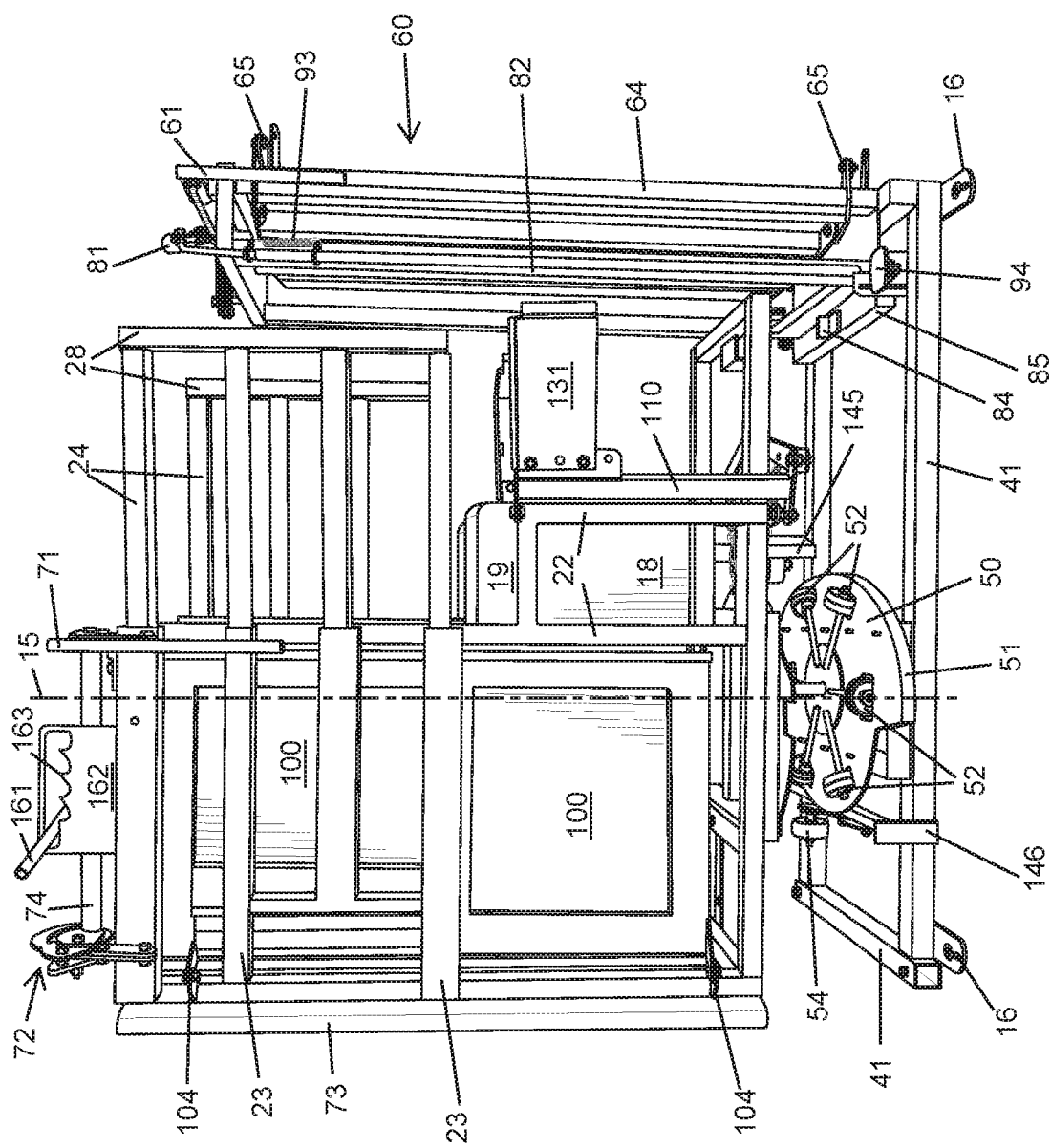
FIG. 6 shows an exploded side perspective view of the livestock handling apparatus of FIG. 1.
Figure 7:
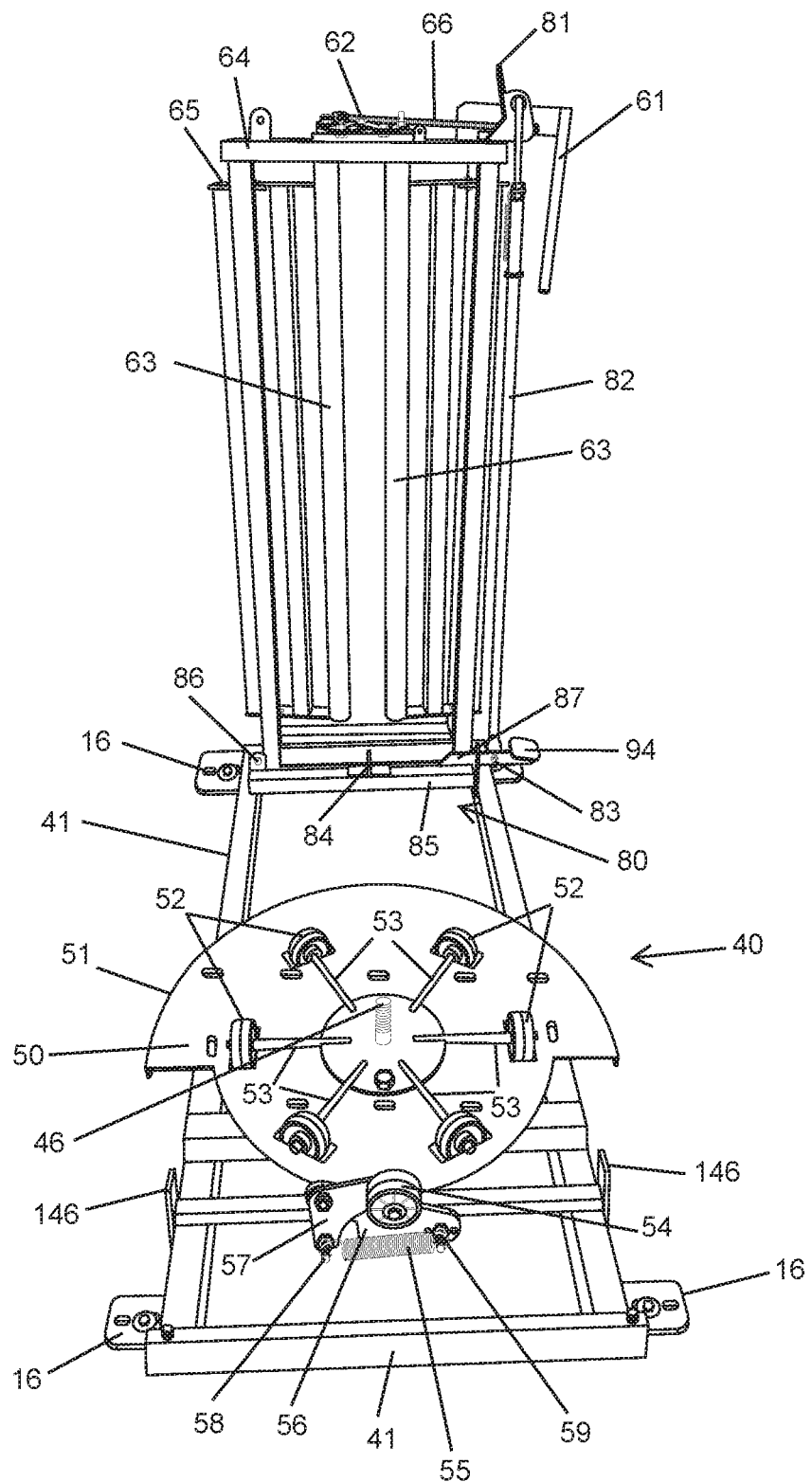
FIG. 7 shows a perspective view of the base of the livestock handling apparatus of FIG. 1 with the frame removed for clarity.
Figure 8:
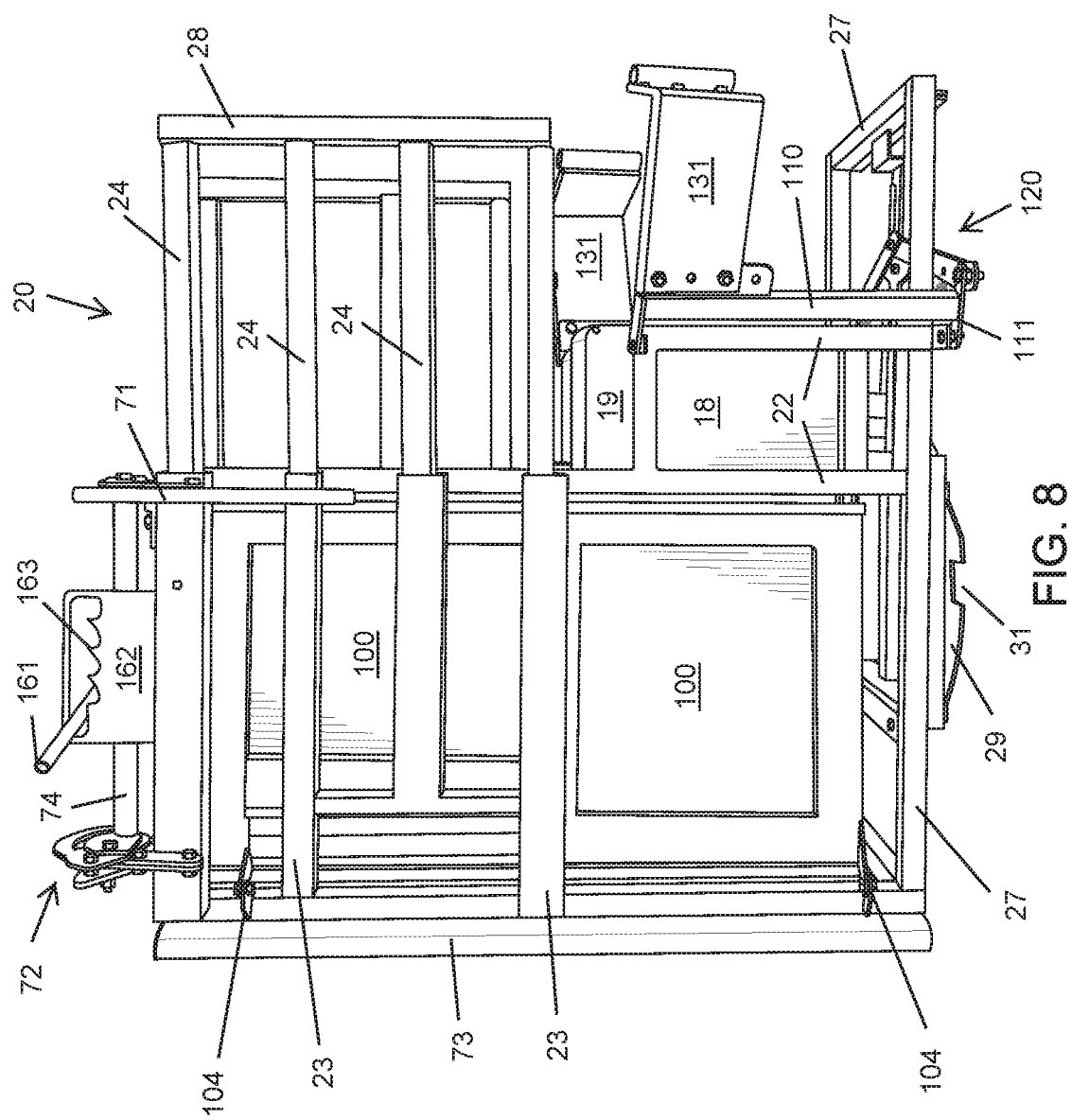
FIG. 8 shows a perspective view of the frame of the livestock handling apparatus of FIG. 1 with the base removed for clarity.

FIGS. 6 to 8 show firstly in FIG. 6 the frame 20 exploded from the base 40 and then each component 20, 40 is illustrated further in FIGS. 7 and 8 respectively. FIG. 7 shows just the base assembly 40 with the base frame 41 and the entrance gate 60 mounted to one end of the frame 41. The base 40 is constructed from a number of tubular members welded together to form the frame 41. Each corner of the frame 41 has a tie down or mounting arm 16 to secure the base 40 to a surface.

The locking mechanism 80 shows the locking bar 85 which is pivotally mounted at one end 86 to the frame 41. The opposing end of the locking bar 85 is attached to the actuating shaft connector 87 which connects the actuating rod 82 to the locking bar 85 and foot pedal 94. As previously described, the lateral movement of the actuating rod 82 by the latch tab release 81 or foot pedal 94 pivots the locking bar 85 and the locking tab 84 attached to the top surface of the locking bar 85 from within the recess 89 of the locking gates 88. As illustrated in FIG. 7 the locking bar is in the down or unlocked position which in use would allow the rotation of the frame 20 around the vertical axis 15.

The planar platform 50 is illustrated having a substantially circular shape with a pair of wings extending the platform 50 on either side and forming the edge 51 around which the roller 121 of the rotation activated mechanism 120 is guided for movement. The planar platform 50 is located over the threaded bolt 46 and secured to the base 40. The threaded bolt 46 extends substantially perpendicular above and through the center of the platform 50 for connection to the frame 20. Six rollers 52 are mounted on roller axles 53 which extend away from the central threaded bolt 46. Pairs of collinear rollers 52 extend from opposite sides of the shaft 46. Each roller 52 is rotatably located within a cutout or aperture 49 in the surface of the planar platform 50. In this embodiment, pairs of rollers extend away from the central threaded bolt 46 along axes extending perpendicular to the bolt or shaft 46. The positioning of each roller 52 within the aperture or cutout 49 locates a portion of each roller below and above the planar platform 50. Also located at the opposing end of the base 40 from the entrance gate 60 is the detent wheel 54 which is pivotally mounted to the base 40 by shaped plates 56, 57 under spring tension by spring 55. As will be described further below, the operation of the detent wheel 54 is designed to locate within the turntable 29 recesses 31 to locate the frame in the two treatment positions. In use, the detent wheel 54 rotates on and is in contact with a surface of the turntable 29, as the turntable 29 rotates a recess 31 is located above the detent wheel 54 and urged by spring 55 the detent wheel 54 rises to locate the detent wheel 54 within the recess 31.

FIG. 8 shows just the frame 20 with the base 40 removed for clarity. In this figure, the turntable 29 and the recess 31 are shown as described above in relation to the base 40. In this figure, the frame 20 is shown as though it would be located in the neutral or starting position prior to rotation around the base 40. The kick gates 131 and the lateral restraining gates 100 are shown in the open position. The kick gates 131 are attached to the pivoting column 110 or adjacent the top end of the column 110. The under floor rotation activated mechanism 120 is attached to the bottom end of the column 110 and as the frame 20 rotates from the neutral position the rotation activated mechanism 120 pivots the column 110 to move both the kick gates 131 from the open position to a closed position behind the legs of an animal in the frame 20.

Figure 9:
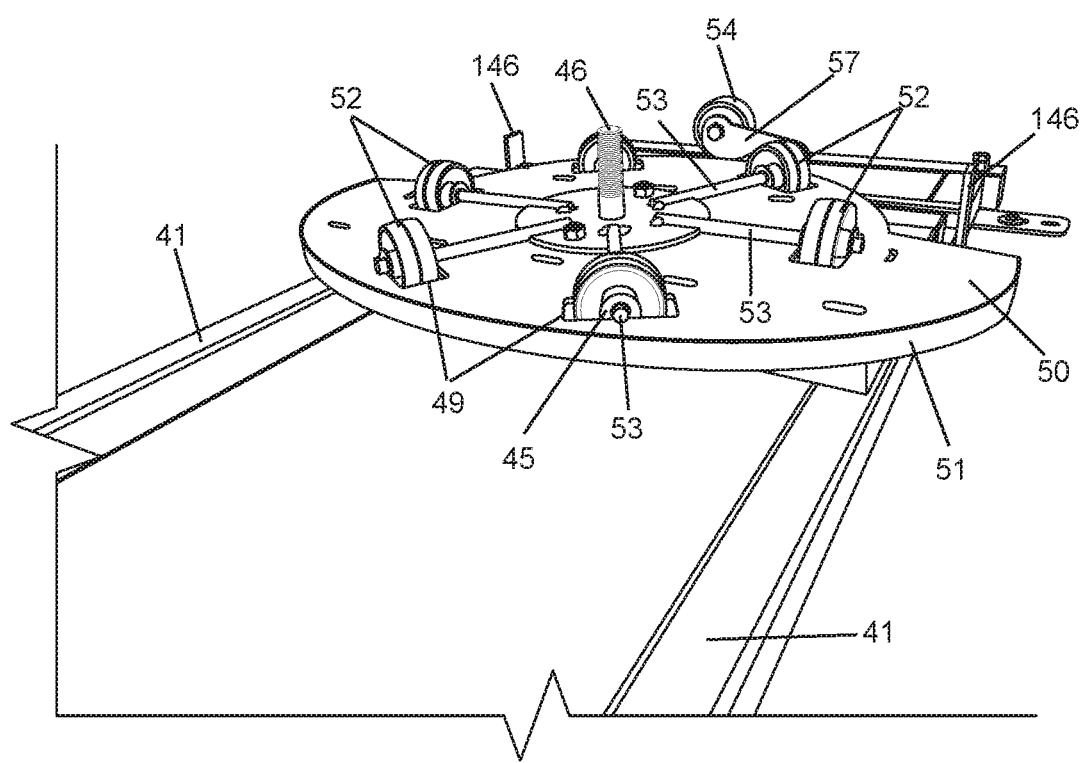
FIG. 9 illustrates a section of the base platform and roller assemblies in accordance with an embodiment of the present invention.

FIG. 9 shows a detailed view of the planar platform 50 and associated components. The platform 50 is mounted over the top of threaded bolt 46 and secured to the base frame 41. The bolt is typically welded to the base frame 41 or secured by any known fastening method. The platform 50 has an edge 51 around which the roller 121 is guided as the frame 20 rotates around the base 40. Six rollers 52 spaced radially 60 degrees apart around the threaded bolt 46 are recessed into the platform 50 through openings or apertures 49. Each wheel 52 is mounted for rotation on axles 53 which extend through the roller 52 and are secured on outer sides of the roller 52 by fasteners 45. By way of example only, the fastener 45 is a spring washer which is secured within a recess in the end of each axle 53. Alternatively, the roller 52 may be secured to the axle 53 by any known fastening device. An outer surface of each roller 52 contacts with the bottom surface 33 of the turntable 29 to assist with the rotation of the frame 20 around the base 40.

Figure 10A:
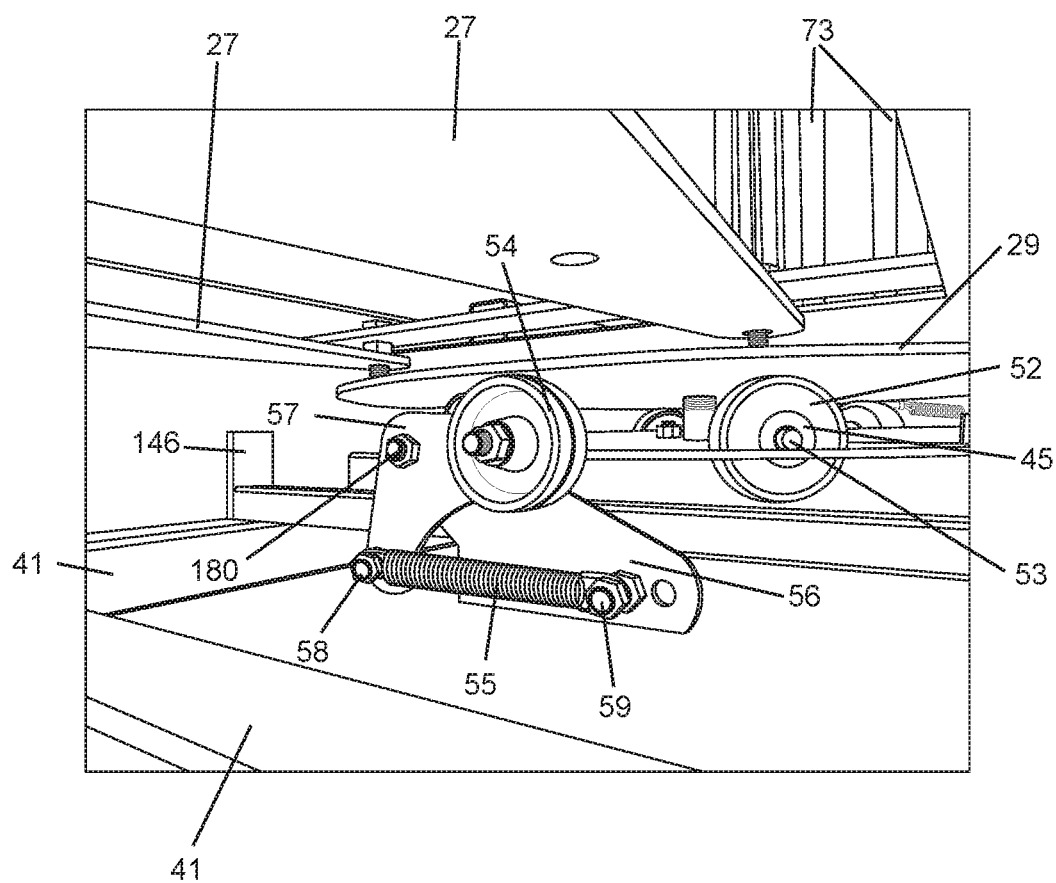
FIGS. 10a and 10b show the operation of the detent wheel as the frame moves around the base.
Figure 10B:
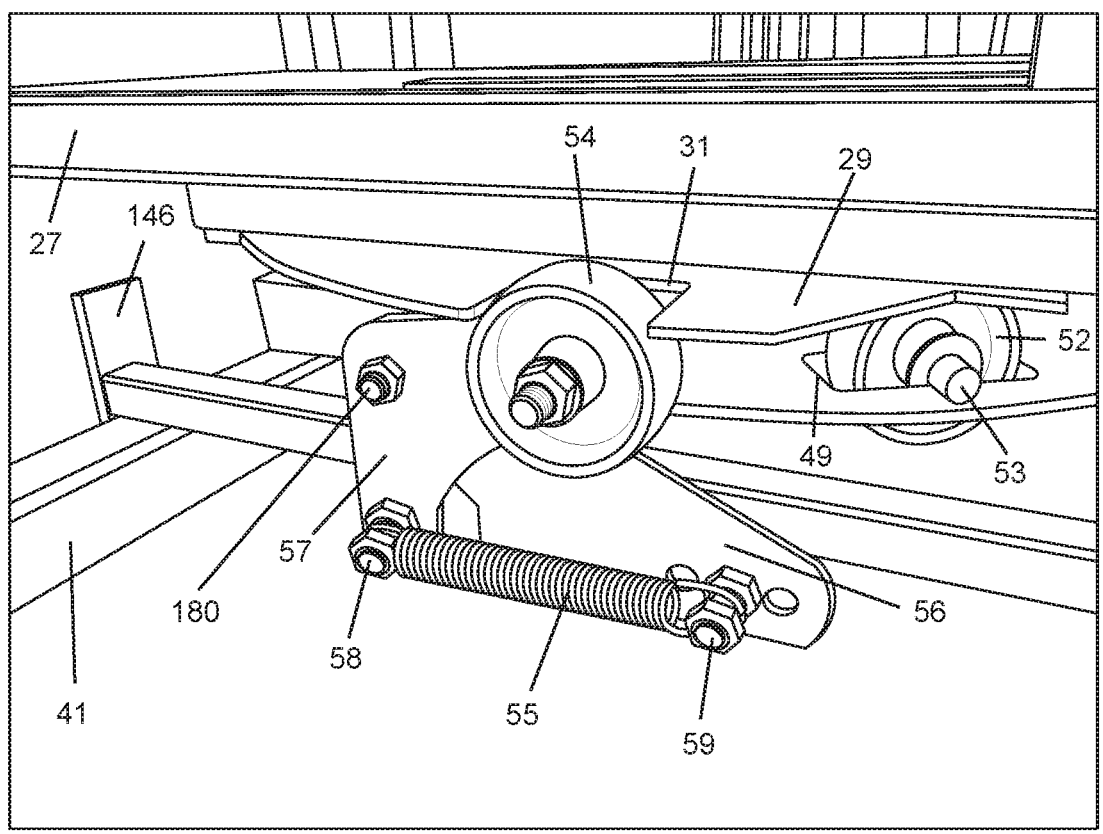

FIGS. 10a and 10b show detailed views of the engagement or movement of the detent wheel 54 as the frame 20 is rotated on the base 40. In these views the frame 20 is mounted over the base 40 and the rollers 52 space apart the turntable 29 above the platform 50. The frame 20 is secured in place on the base 40 by a fastener 48 attached on the end of the threaded bolt 46. The fastener 48 is located under a removable floor section 21 of the frame 20.

In FIG. 10a the frame 20 is located in the neutral or start position and the detent wheel is located against the bottom side of the turntable 29 and rotates as the frame 20 rotates around the base 40. The detent wheel 54 is biased against the bottom of the turntable 29 by a combination of brackets 56, 57 which are mounted to the base 40 and the detent wheel 54 under the tension of spring 55. A first bracket 56 is mounted to the base frame 41 of the base 40. One end of the spring 55 is attached to a mounting bolt 59 on the fixed bracket 56. The other end of the spring 55 is mounted on the mounting bolt 58 of the pivoting plate 57. A pivot point 180 is located on the pivoting plate 57 around which the pivoting plate 57 rotates.

FIG. 10b illustrates the position of the frame once it has been rotated clockwise through 90 degrees. In this position the detent wheel 54 is engaged within the recess 31 of the turntable 29. As was shown in FIG. 10a as the frame rotates the detent wheel 54 rotates on the turntable 29. As the turntable 29 and the frame 20 approaches the first treatment position, the detent wheel 54 releasably engages the recess 31. Under the urging of the spring 55 the pivoting plate 57 rotates and locates the detent wheel 54 within the recess 31. In this position, the rear of the animal located in the frame 20 would be positioned to one side of the apparatus 10 to allow the operator to perform any veterinary procedures on the rear of the animal. Alternatively, the frame 20 could be rotated 180 degrees counter-clockwise to locate the detent wheel 54 in a further recess 31 located diametrically opposite the first recess 31 in the turntable 29.

As the frame 20 is not locked in either of the above positions a small lateral force applied to the frame 20 will release the detent wheel 54 from within the recess 31 in the turntable 29. The recesses 31 are simply to allow the frame to be movably positioned in both treatment positions.

Figure 11A:
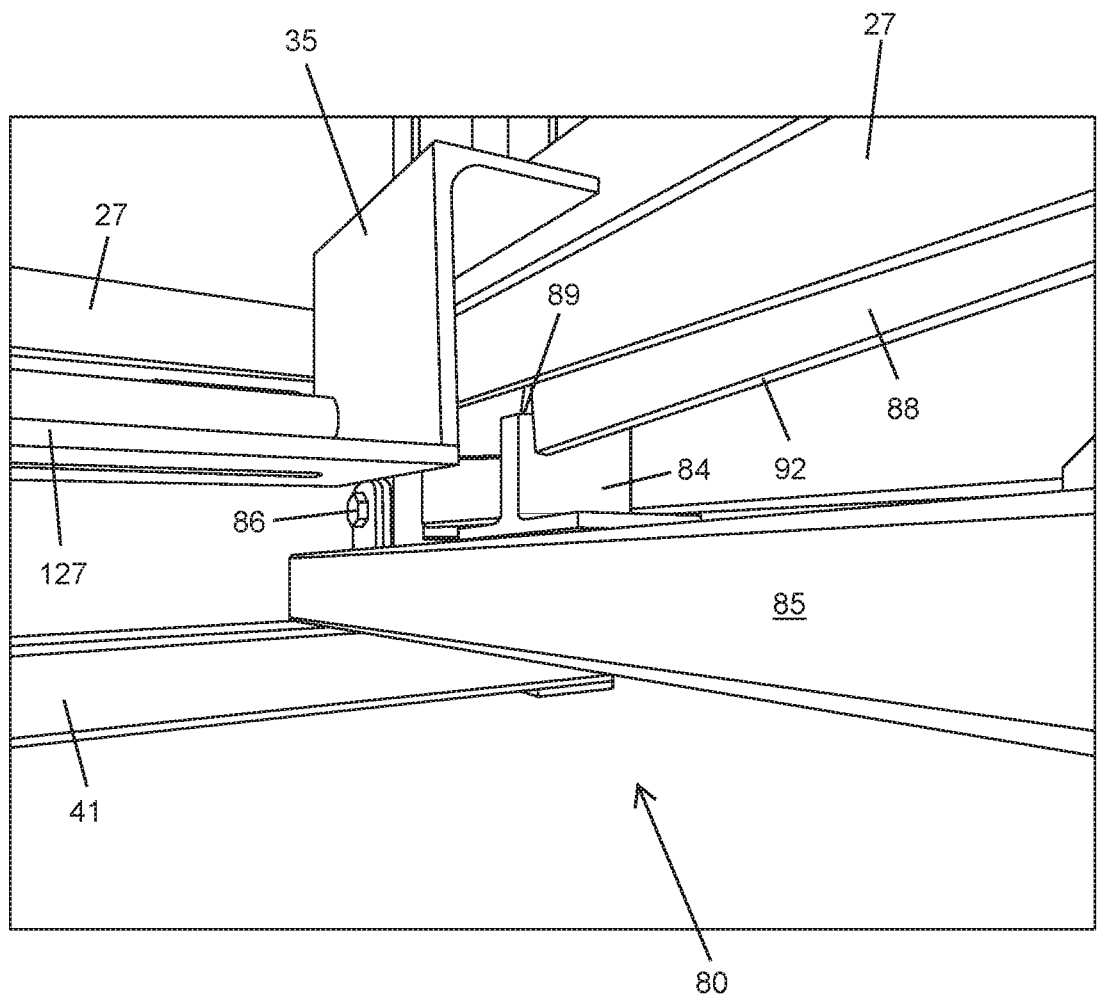
FIGS. 11a to 11c show the operation of the first locking mechanism used to lock the base and frame in a first position which allows an animal to enter or leave the livestock handling apparatus.
Figure 11B:
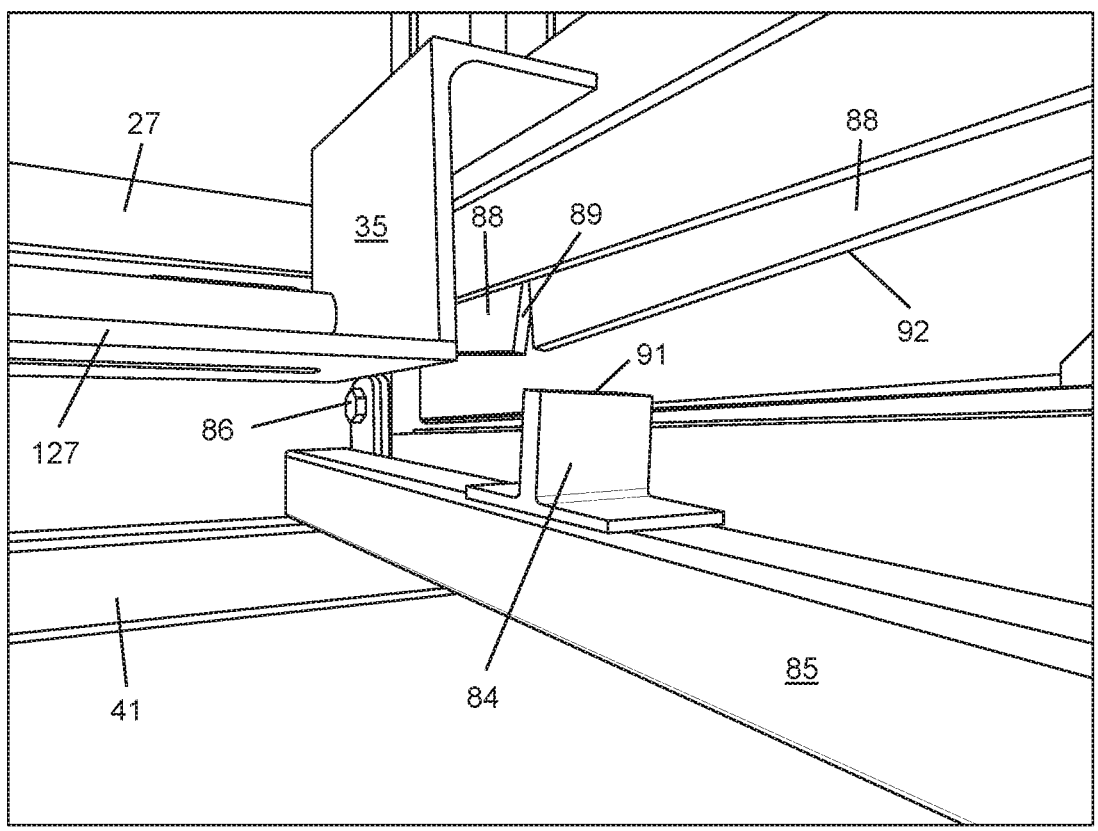
Figure 11C:
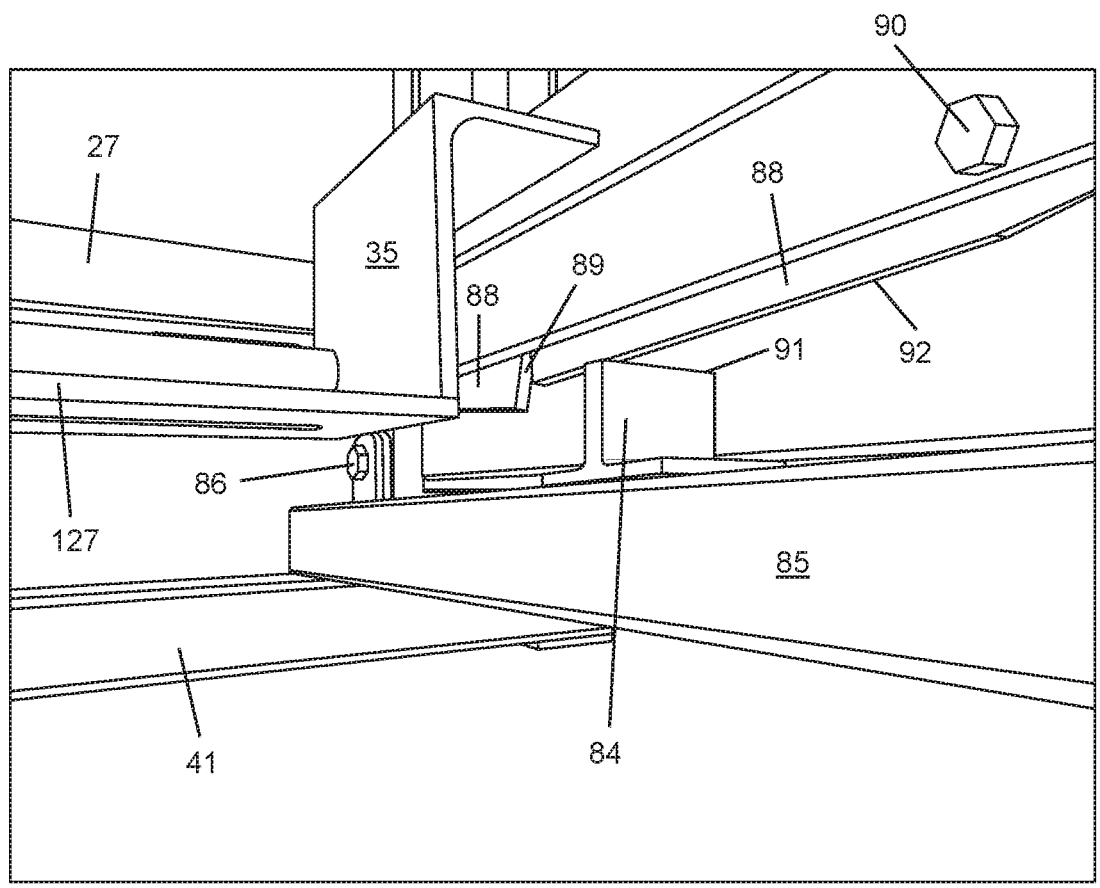

FIGS. 11a to 11c illustrate the operation of the locking mechanism 80 which is used to lock and unlock the frame 20 to the base 40 in the neutral position. As described above the locking bar 85 is pivoted to the base 40 at pivot point 86. This allows the locking bar 85 and the locking tab 84 to rotate out of the locking position. FIG. 11a shows the locking bar 85, locking tab 84 located within the recess 89 formed between the ends of the locking gates 88 as it would be positioned in the neutral position with the frame 20 locked from rotation on the base 40. In order to allow the frame 20 to be rotated on the base 40 the activating latch 81 or foot pedal 94 is rotated down which pushes the actuating shaft 82 vertically and moves the locking bar 85 and subsequently the locking tab 84 away from the recess 89. The actuating shaft 82 is attached to the locking bar 85 by tab 87 which pivots around the pin 83 attached to the end of the shaft 82 and the foot pedal 94. Illustrated in FIG. 11b the locking tab 84 is pivoted clear of the locking gates 88 and the frame 20 is now able to be rotated around the base 40.

In order to relock the frame 20 to the base 40 to return to the neutral or start position the activating latch 81 or foot pedal 94 is returned to the raised position prior to the frame 20 being rotated back from one of the two treatment positions. As illustrated in FIG. 11c as the frame 20 is rotated with the locking bar 85 in the raised position the locking tab 84 with its top surface 91 now contacts and pushes against a bottom surface 92 of one of the locking gates 88. As each locking gate 88 is pivoted to the bottom of the frame 27 at pivot points 90 as the top surface 91 of the locking tab 84 engages with the bottom surface 92 causes the locking gate 88 to rotate around the pivot point 90. The other locking gate 88 remains in a lowered position and as the locking tab 84 approaches the recess 89 the locking tab 84 will become captured within the recess 89 and the locking gate 88 which had been pivoted drops back to its starting position as shown in FIG. 11a. This relocks the frame 20 on the base 40 in the neutral or start position.

Figure 12:
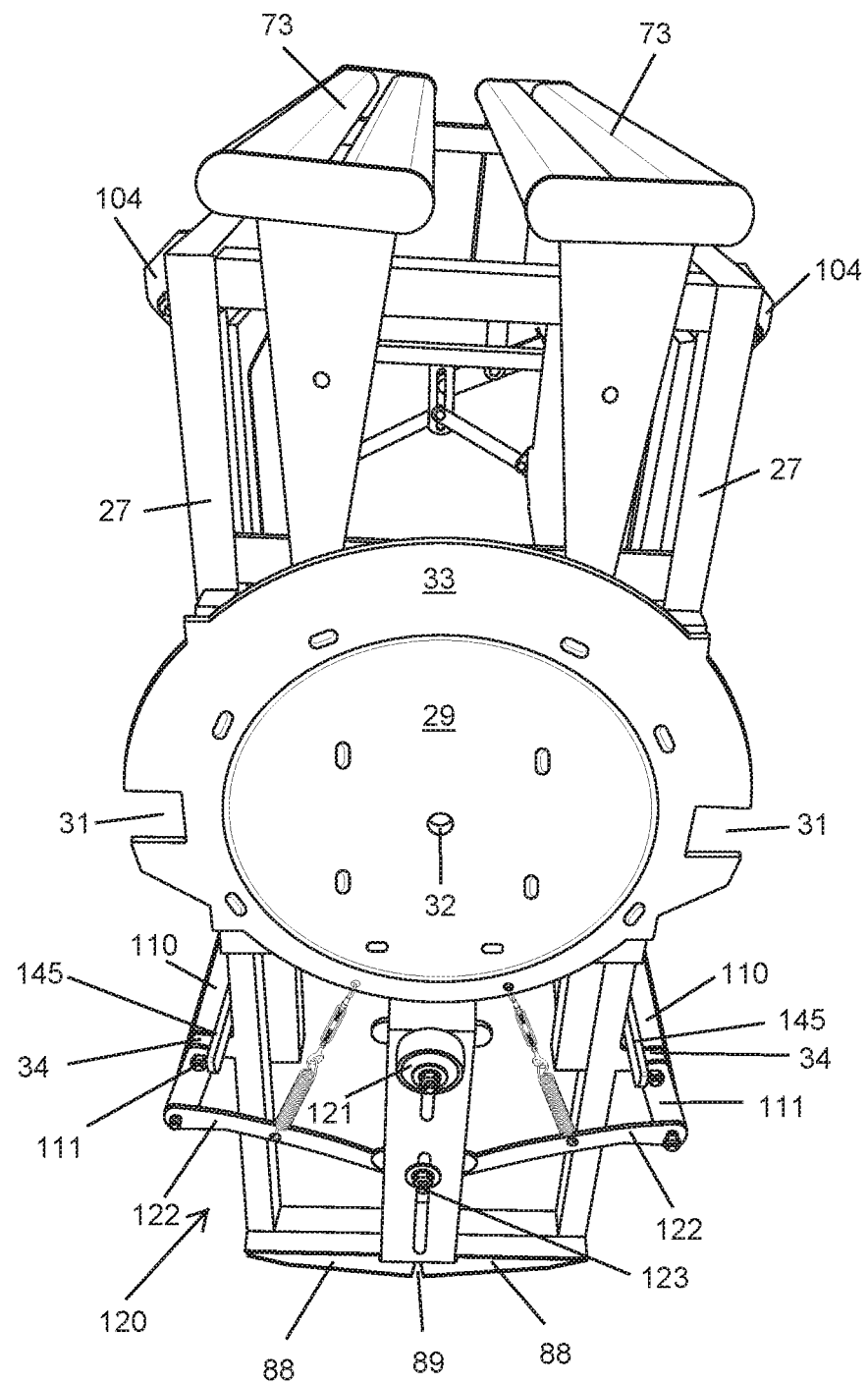
FIG. 12 shows a bottom view of the frame showing the turntable and the rotating activation mechanism.
Figure 13:
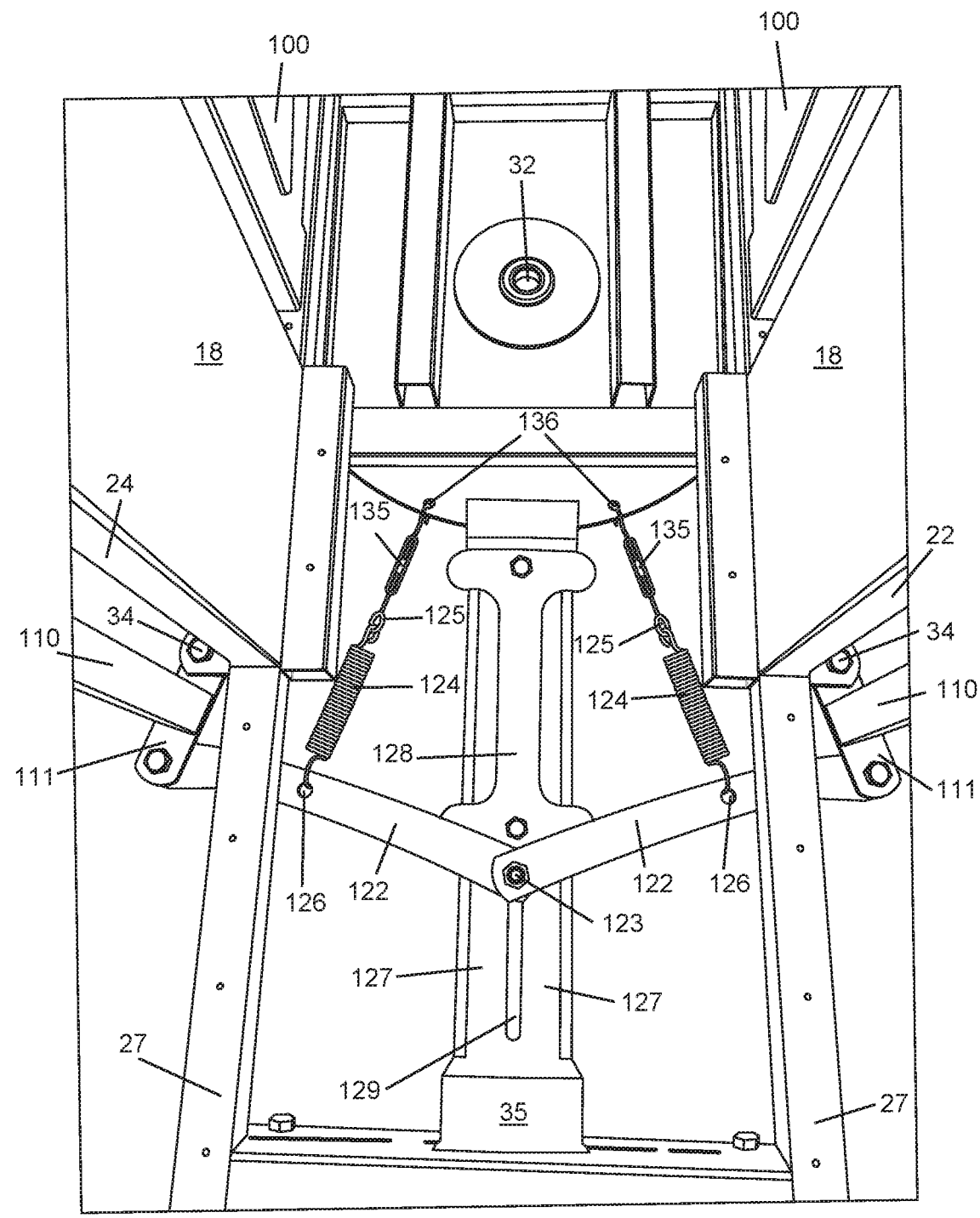
FIG. 13 shows an enlarged perspective view of the top side of the rotating activation mechanism.

FIGS. 12 and 13 show the underside of the frame 20 and the rotation activated mechanism 120. FIG. 12 shows the turntable 29 with a central aperture 32 for receiving the threaded axle 46 to secure the frame 20 to the base 40. Also illustrated are the diametrically opposite recesses 31 located around the periphery of the turntable race 33. In use, as the frame 20 rotates, the detent wheel 54 moves around the turntable race 33 until the detent wheel 54 approaches one of the recesses 31. As the frame 20 rotates further the detent wheel 54 is received within the recess 31 under urging of spring 55. Also shown in FIG. 12 are the locking gates 88 mounted on the underside of the support frame 27 of the frame 20. Each locking gate 88 is pivotally mounted at one end 90 to the support frame 27. The opposing end of each locking gate 88 forms the recess 89 located between the ends of the locking gates 88. In use, the recess 89 is used to receive the locking tab 84 of locking mechanism 80 which secures the frame 20 on the base 40 in the neutral or start position. When the locking bar 85 is raised and the frame 20 is rotated on the base 40, one of the locking gates 88 will rotate around the pivot 90 and move with the locking tab 84. The other locking gate 88 remains in the closed position so that as the locking tab 84 approaches the recess 89 the locking tab 84 will be captured against the end of the closed locking gate 88 and the other locking gate 88 drops down to secure the locking tab 84 within the recess 89 and prevent rotation of the frame 20 on the base 40.

FIGS. 12 and 13 show the components of the rotation activated mechanism 120 which are located on the underside of the frame 20. The rotation activation mechanism 120 consists of a pair of spaced apart tracks 127 mounted to the support frame 27. A central carriage 128 is located on one side of the pair of tracks 127 on the opposite side the roller 121 is attached through the gap or slot 129 located between the tracks 127 to one end of the central carriage 128. On the opposite end of the carriage 128 a pair of links 122 are mounted for movement along the tracks 127. The opposite end of the links 122 are connected to the bottom activating column arms 111 of the vertical column 110.

FIG. 13 shows a top down view of the rotation activation mechanism 120 as would be seen with the floor 21 removed from the frame 20. The tracks 127 are mounted to the support frame 27 by brackets 35 at either end of the tracks 127. The tracks 127 are mounted so as to leave a slot 129 between the tracks 127. As was shown in FIG. 12 at one end of the central carriage 128 and on the opposite side to that shown in FIG. 13 the roller 121 is mounted. One end of the links 122 are also mounted to the central carriage 128 by fastener 123. One end of return spring 124 is attached to the links 122 at aperture or mounting point 126. The opposite end 125 of the spring 124 is secured to one end of screw tensioner 135 with the opposite end of the screw tensioner 135 connected through an aperture 136 in the turntable 29. As will be described in further detail below the springs 124 are used to return the central carriage 128 back to the start or neutral position. The central carriage 128 is moved along the tracks 127 by the roller 121 as it comes into contact with the edge 51 of the planar platform 50 as the frame 20 rotates on the base 40. Also, as the central carriage moves along the tracks 127 this also moves the links 122 which pivot the vertical columns 110 and moves the associated link assembly 111 on either side of the frame 20. The movement of the links and columns effectively opens and closes the kick gates 131.

Figure 14A:
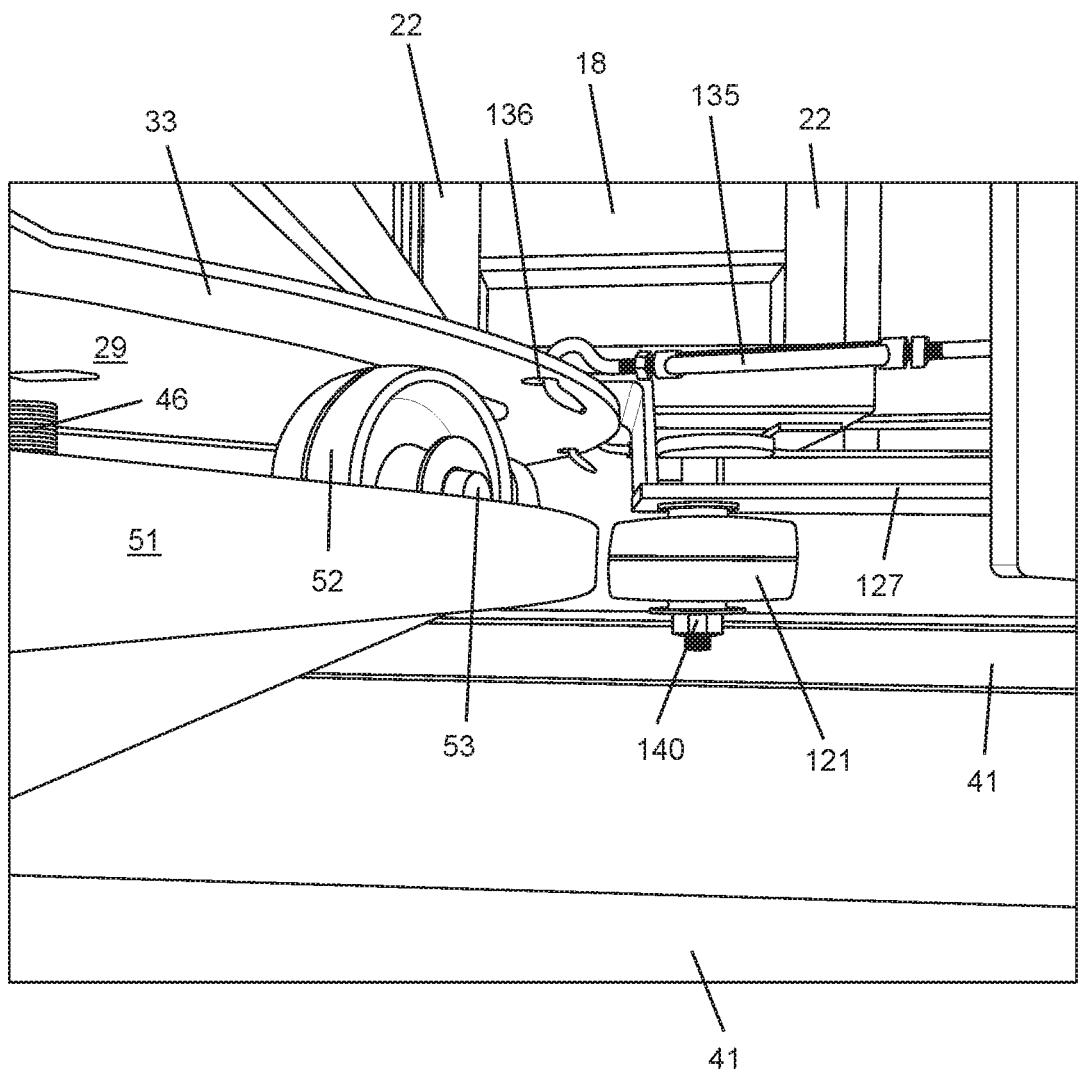
FIGS. 14a to 14c illustrate the operation of the rotating activation mechanism as the frame is rotated around the base.

FIGS. 14a through to 14c show the movement of the rotation activation mechanism 120 and the roller 121 as it moves around the edge 51 of the platform 50. FIG. 14a shows the rotation activation mechanism 120 and the roller 121 in the start or neutral position in which the frame 20 is locked to the base 40 by the locking mechanism 80. The roller 121 is mounted to the central carriage 128 by a mounting bolt and fastener 140 and moves along the slot 129 as it is moved around the edge 51 of the platform 50. In this position the kick gates 131 are in the open position.

Figure 14B:
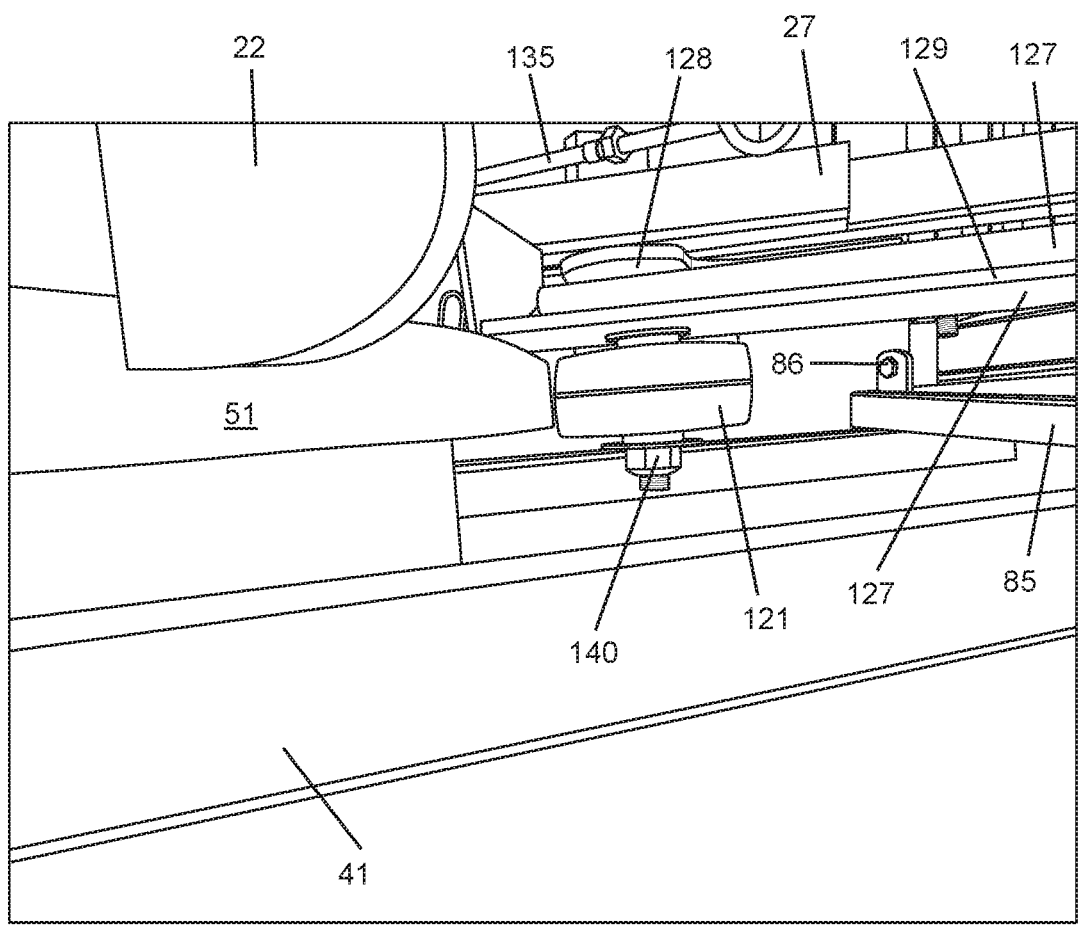

FIG. 14b shows the rotation activation mechanism and the roller 121 in the position as the frame 20 is rotating around the base 40. It should however be noted that the frame 20 can be rotated in both clockwise and anti-clockwise directions around the base 40. As the roller 121 comes into contact with the edge 51 it is pushed laterally along the tracks 127 which at the same time moves the links 111 which rotate the column 110 and the kick gates 131 to the closed position. As described above the kick gates 131 are maintained in the closed position by the contact of the roller 121 against the edge 51 of the platform 50 as the frame 20 rotates around the base 40.

Figure 14C:
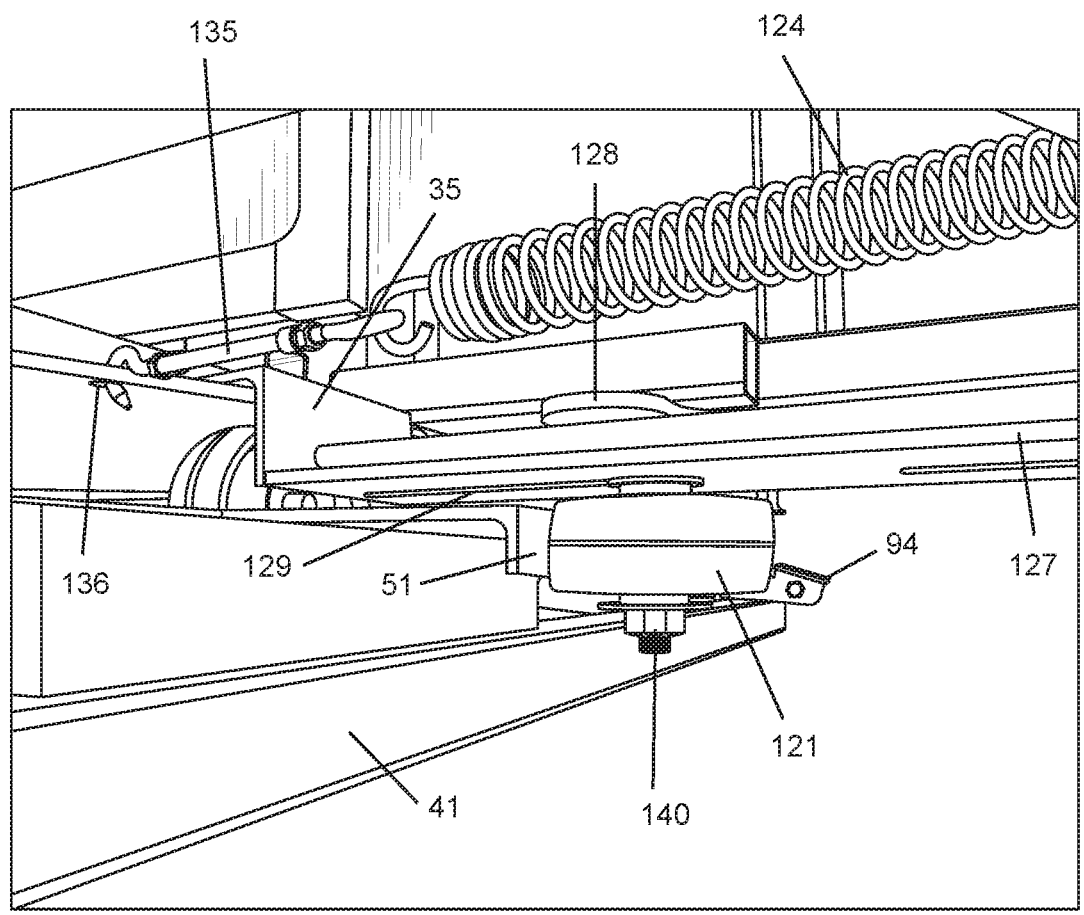

FIG. 14c shows the frame 20 located in one of the two treatment positions. The first treatment position is achieved when the frame 20 is rotated clockwise 90 degrees and the second treatment position is achieved by rotating the frame 20 anti-clockwise 180 degrees. To then return the frame 20 to the start or neutral position the frame 20 is rotated a further 90 degrees clockwise. In the position shown in FIG. 14c the central carriage 128 has moved along the tracks 127 by the roller 121 coming into contact with the edge 51 of the platform 50 to move or rotate the associated vertical column 110, the link assembly 111 and the kick gates 131 to the closed position. In this position also, the return springs 124 are under tension and when the frame 20 is rotated back to the neutral or start position the spring 124 will move the central carriage 128, the roller 121 and the kick gates 131 to the respective start or open positions.

Figure 15A:
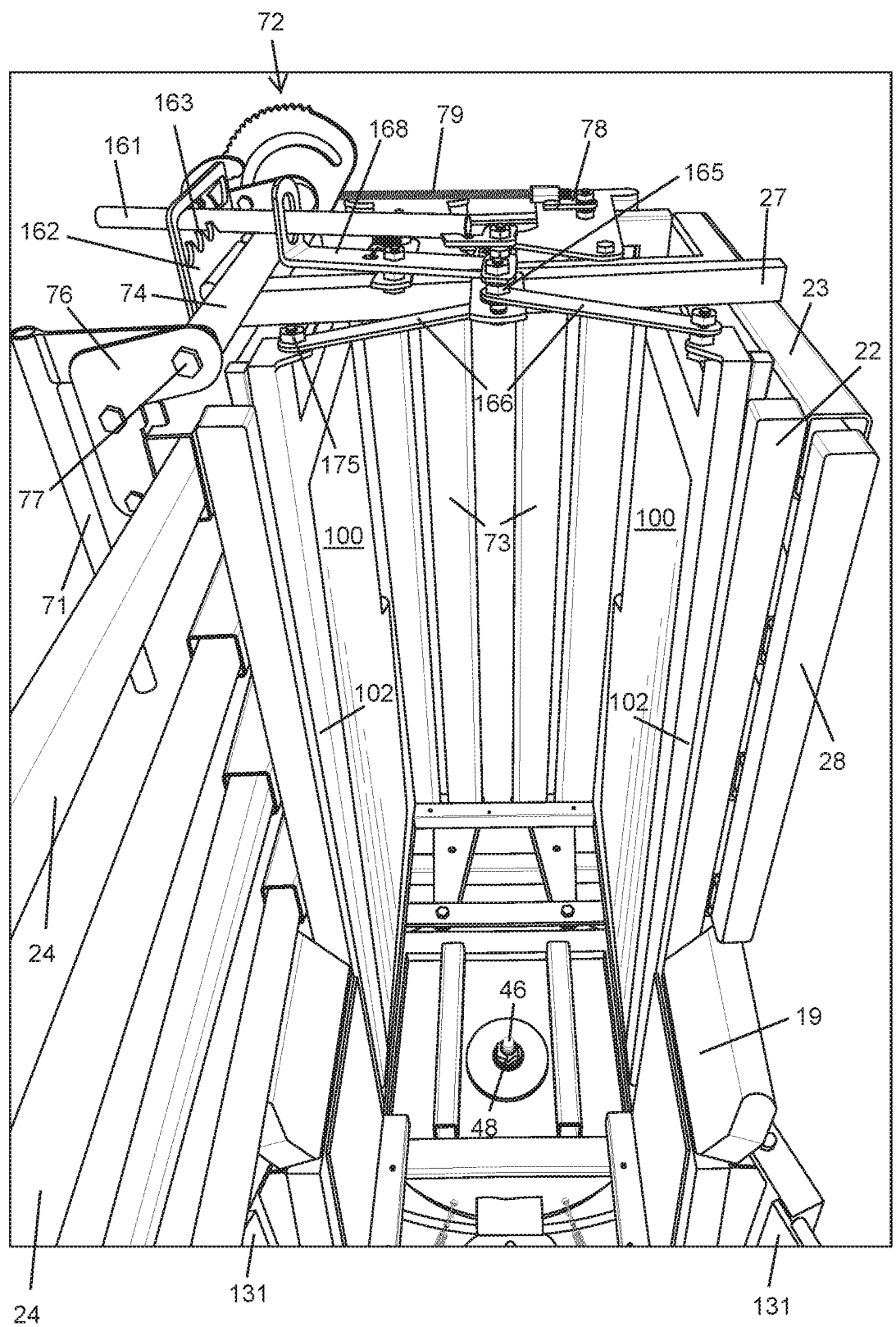
FIGS. 15a and 15b show enlarged views of the lateral restraining gates control mechanism.
Figure 15B:
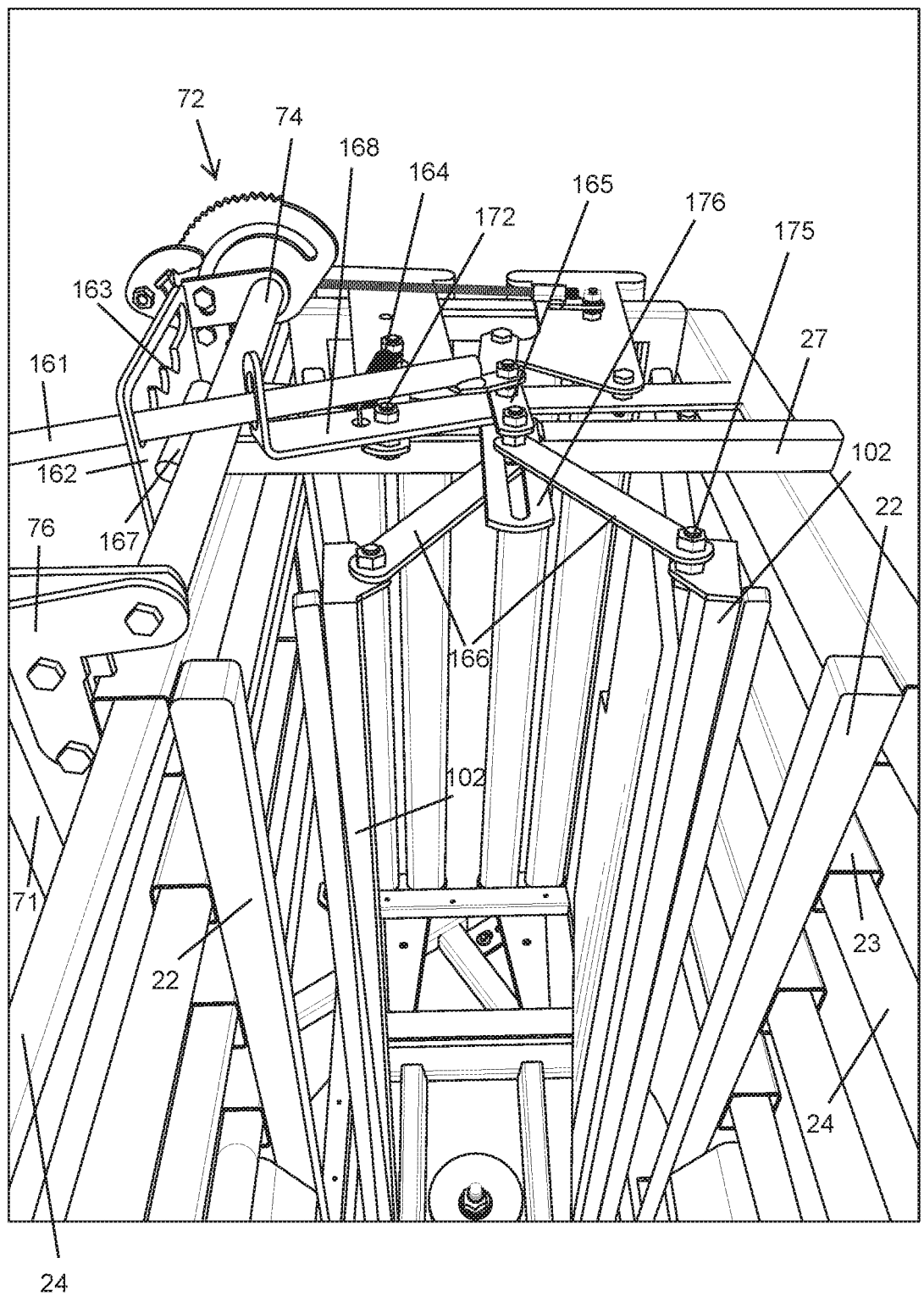

FIGS. 15a and 15b show detailed views of the operating mechanism 160 utilized to secure the lateral squeeze gates 100 against the animals' ribs in the apparatus 10. FIG. 15a shows the lateral squeeze gates 100 in the open position and FIG. 15b shows the lateral squeeze gates 100 in the fully closed position. The operating handle 161 can be moved along the linear ratchet mechanism 162, 163 to vary the position of the lateral squeeze gates 100 to suit the size of the animal within the apparatus 10. The guide plate 162 is attached to the top horizontal fixed member 24 of the frame 20. The guide plate 162 has an opening adapted to receive an end of the operating lever 161 therethrough. The opening also has in a lower portion the ratchet teeth 163 which limit the linear movement of the operating lever 161. The operating lever 161 can be positioned in any one of four different positons along the ratchet teeth 163, as the operating lever 161 moves towards the exit gate operating handle 71 the lateral squeeze gates 100 move closer towards the center of the frame 20.

The operating mechanism 160 is attached to the top front corner of each lateral squeeze gates 100 by links 165, 166 and to the frame 27 by bracket 176. The links 166 have one end attached by fasteners 175 to the top front corner at the free end 102 of each lateral squeeze gates 100. The opposite end of each link 166 is connected through an aperture in bracket 176 to one end of the link 165 by a fastener. The other end of the link 165 is connected to an end of the L-shaped bracket 168 and the operating lever 161. The movement of the operating lever 161 moves the link 165 and the fastener connecting the end of the links 166 laterally along the aperture in the bracket 176. The L-shaped bracket 168 has an opening through which the operating lever 161 extends through to be attached to the end of the link 165. The L-shaped bracket 168 is centrally pivoted to allow rotation about the pivot 172 which is attached to the frame 27 by a further bracket. The L-shaped bracket 168 also has an aperture positioned adjacent the pivot 172 through which one end of the spring 164 is connected. The other end of the spring 164 is attached to a bracket extending from the frame member 27.

The return spring 164 is attached to the operating lever or handle 161 so that when the exit gate 70 is opened by the operating handle 71 a cam 167 attached to the rotating shaft 74 will raise the operating lever 161 from the linear ratchet mechanism 162, 163 and the spring 164 will return the squeeze gates 100 to the open position and the operating handle 161 to the start position. With the squeeze gates 100 returned to the open position away from the animal's ribs and with the exit gate 70 open the animal is free to leave the apparatus 10.

FIGS. 15a and 15b also show the end mounting plate 76 of the exit handle assembly 70. The end of the operating shaft 74 is secured within the mounting plate 76 by fastener 77.

Figure 16:
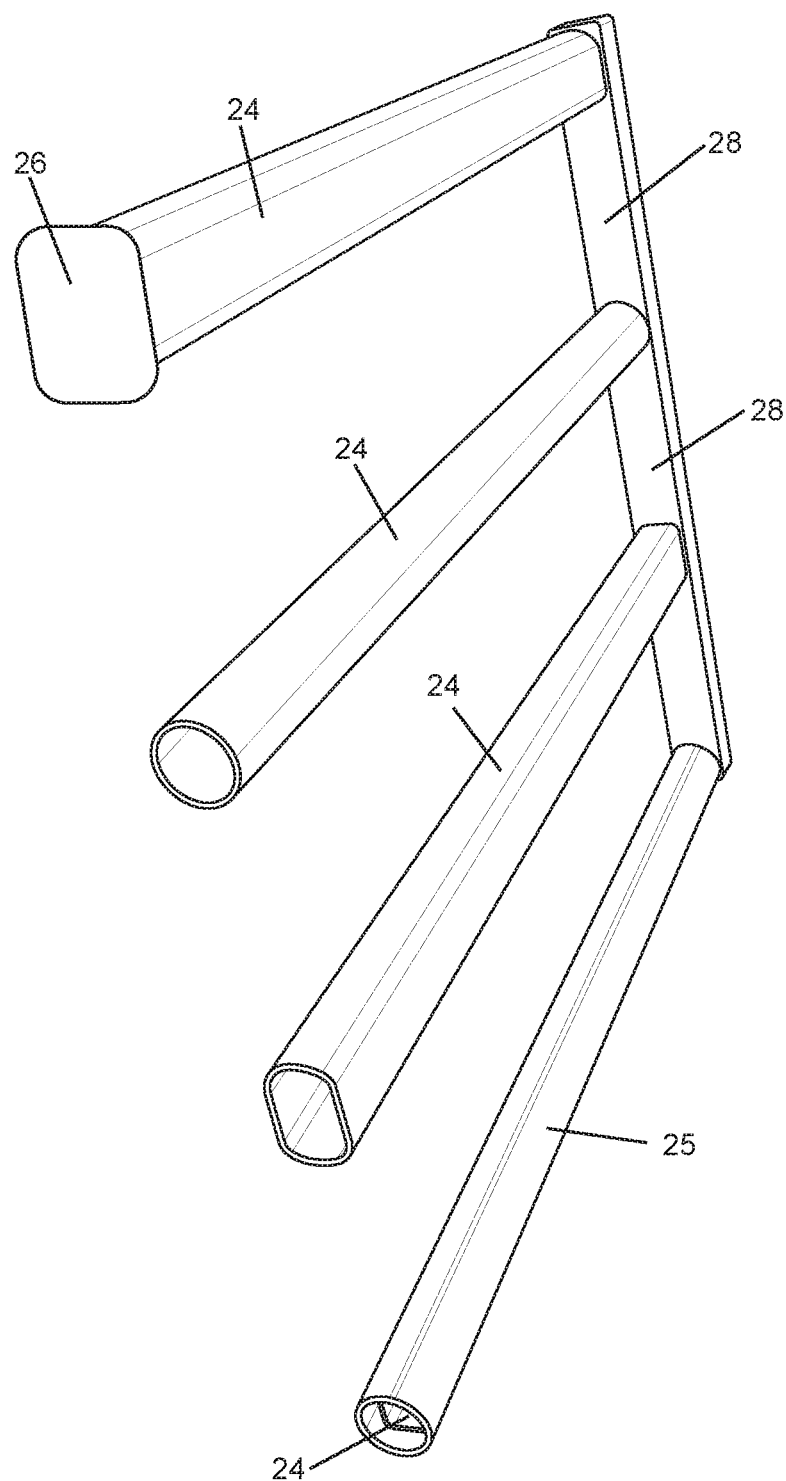
FIG. 16 illustrates a frame gate removed from the end showing the horizontally disposed second elongate frame members.

FIG. 16 shows the sliding gate assembly formed by the horizontal members 24 and the vertical member 28. As described above, the horizontal members 24 are slideably received within the hollow horizontal members 23 forming the frame 20 of either side of the frame assembly 20. The gate consists of four horizontal members 24 equally spaced along the vertical member 28.

The top horizontal member 24 has an end plate 26 which has the same shape as the member 24 but is sized to form a lip around the end of the horizontal member 24. In use, when the sliding gate horizontal members 24 are inserted into the fixed hollow horizontal members 23 a fastener is inserted into an aperture in the top fixed member 23 to capture the end plate 26 to prevent the sliding gate from being completely pulled out of the fixed members 23.

Alternatively, a release mechanism (not shown) could be attached to one side of the top horizontal member 24. The release mechanism has an operating handle which is positioned on an outer most corner of the gate assembly. The release mechanism only locks the gate assembly in the extended position. A hook and recess are adapted to connect over a shaft extending internally of the top hollow horizontal member 23. The release mechanism is mounted at an angle with respect to the top surface of the horizontal member 24. The recess hooks onto the shaft and is released by an operator pushing vertically down on the handle to release the hook and recess from the shaft. This allows the operator to then retract the gate assembly into the hollow horizontal member 23. Likewise, the operator can pull back on the operating handle to relocate the gate assembly in the extended position with the release mechanism recess located over the shaft.

To assist with the movement of the horizontal members 24 into and out of the hollow vertical members 23 a tube 25 is inserted over at least one of the horizontal members 24. As illustrated in FIG. 16 the bottom horizontal member 24 has a rubber tube 25 covering the surface of the member 24. Alternatively the tube 25 could be formed from any plastics material which reduces the friction and noise generated between the members 23, 24.

Figure 17A:
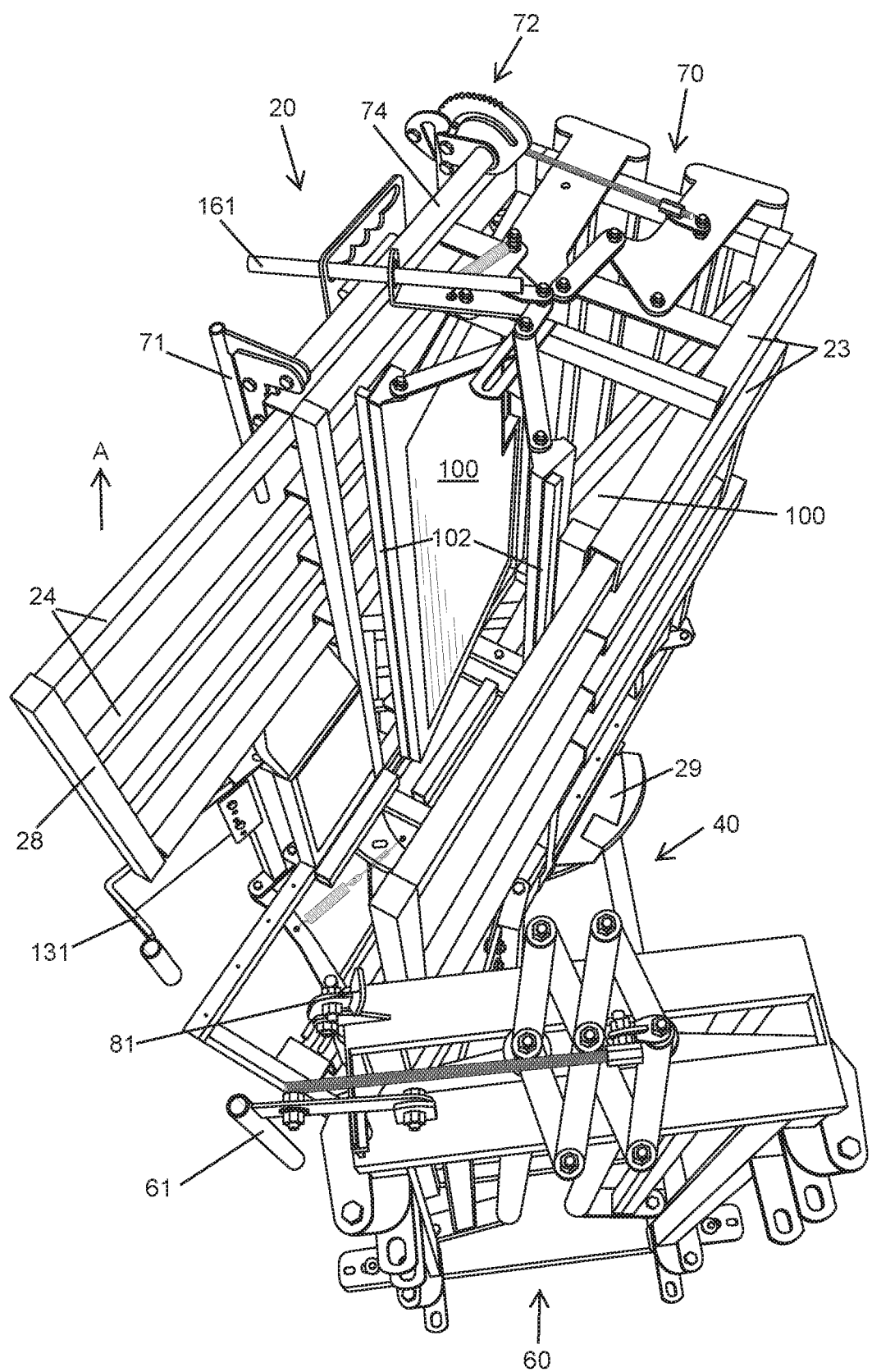
FIGS. 17a to 17d show perspective views of the apparatus as the frame moves around the base from a start position to the first and second treatment positions and between the first and second treatment positions.

FIGS. 17*a* to 17*d* illustrate the rotation of the frame 20 around the base 40. As was previously shown in FIGS. 1 to 5 the frame 20 is located in the start or neutral position which allows an animal to enter or leave the apparatus 10. Both the entrance gate 60 and the exit gate 70 would now be in the closed positions, with the neck of an animal positioned between the head bale or stanchions 73 of the exit gate 70. The lateral restraining gate operating mechanism 160 is activated to move the free ends 102 of each lateral squeeze gate 100 against the ribs of the animal in the apparatus 10. In this position, the locking latch 81 is raised and the locking bar 85 and the locking tab 84 is in the raised position effectively locking the frame 20 on the base 40 in the neutral or start position. In order to rotate the frame 20 on the base 40 the latch 81 or foot pedal 94 is pushed down which activates the shaft 82 which pivots the locking bar 85 down and releases the locking tab 84 from between the recess 89 of the locking gates 88. As shown in FIG. 17*a* the frame 20 is now able to be rotated on the base 40 towards the first treatment position. The frame 20 is rotated by applying a lateral force on the frame 20 so that it rotates around the vertical axis 15. As the frame begins to rotate clockwise around the base 40 in the direction of arrow A, this engages the rotation activated mechanism 120 located on the bottom of the frame 20. The rotation activation mechanism 120 and the central carriage 128 are moved laterally along the tracks 127 by the engagement of the roller 121 with the edge 51 of the planar platform 50 located on the base 40. The profile of the edge 51 is shaped to push the roller 121 and the central carriage 128 laterally along the tracks 127 as the frame 20 is rotated. As this occurs, the links 111 rotate the vertical column 110 which in turn moves to close the kick gates 131.

Figure 17B:
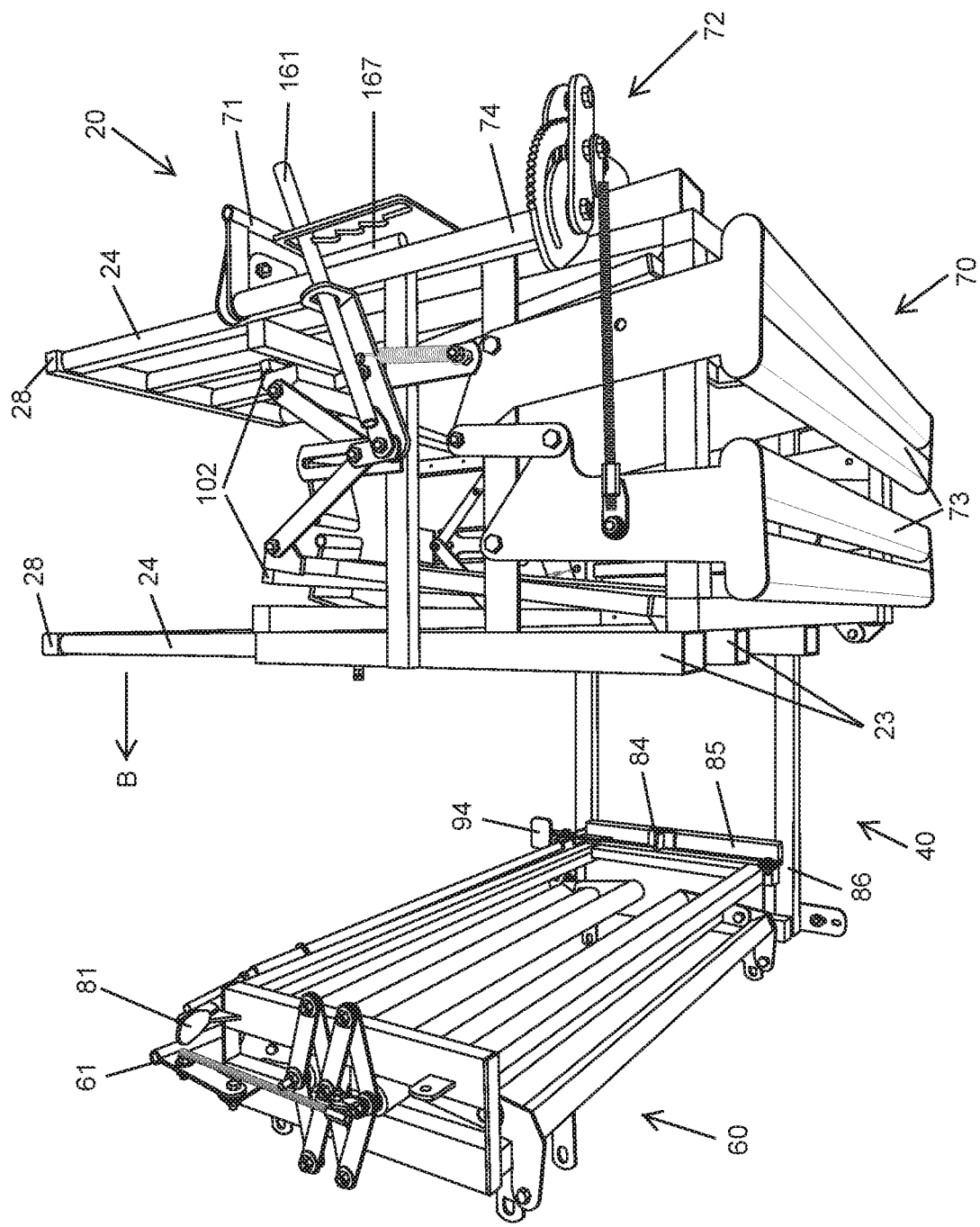
Figure 17C:
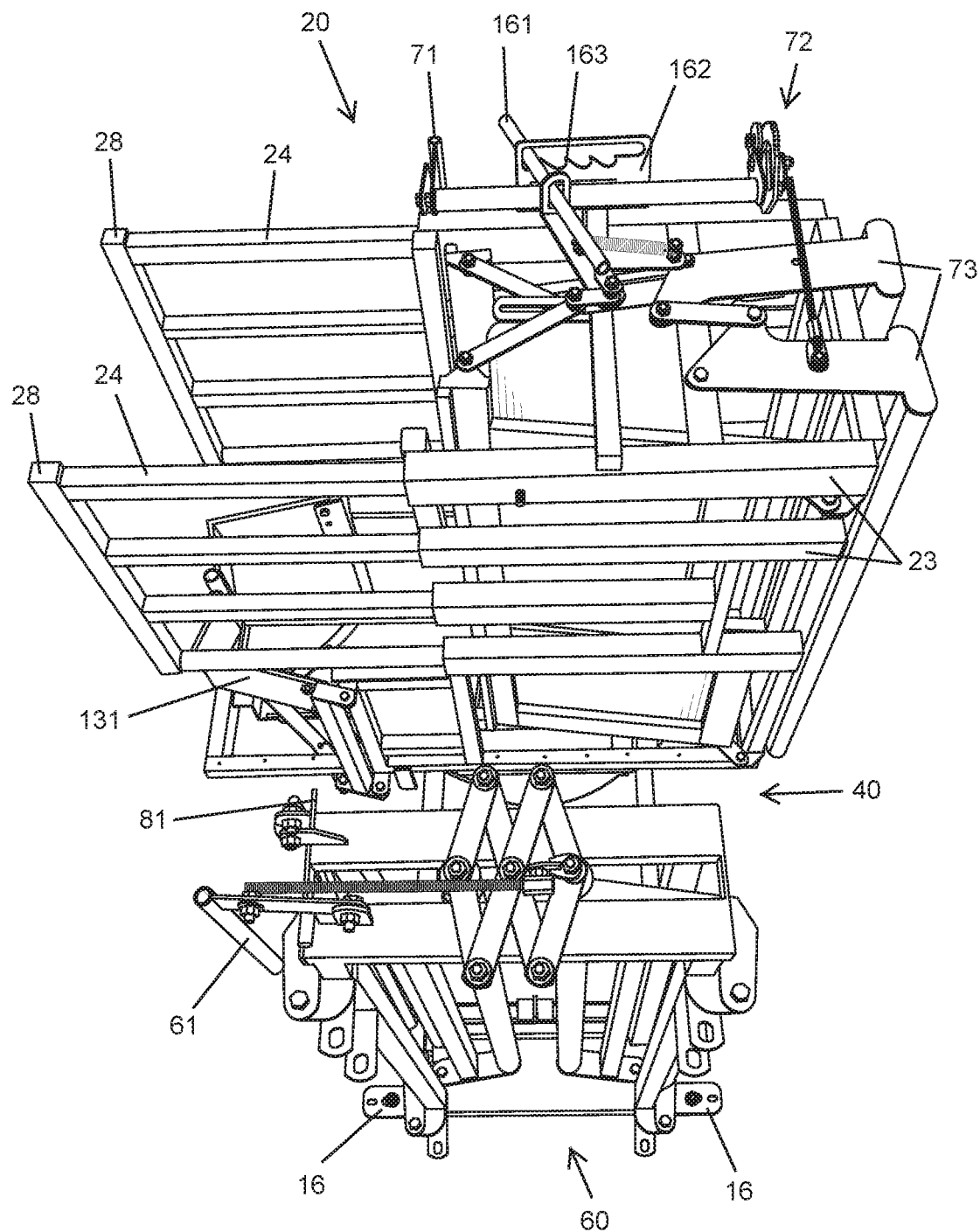

FIGS. 17*b* and 17*c* show the frame 20 now located in the first treatment position. The first treatment position allows an operator to perform any task associated with the rear or the animal. For example, the animal can be castrated, backline drench treatments can be carried out and as the rear of the animal is well exposed fire branding can be carried out if required. At this position, the frame 20 has been rotated clockwise 90 degrees from the starting position. The detent wheel 54 is now located within one of the recesses 31 in the turntable 29. The detent wheel 54 does not lock the frame 20 to the base 40, it simply arrests the rotation of the frame 20 on the base 40 and with the application of a lateral force in the direction of arrow B the frame 20 can be rotated anti-clockwise by 180 degrees to be positioned in the second treatment position.

FIGS. 17*b* and 17*c* also show the positioning of the movable gates on the frame 20. The moveable gates consist of the horizontal members 24 which are received within the hollow horizontal members 23 to form the frame assembly. In FIGS. 17*b* and 17*c* the gates are fully extended to allow access to the rear of the animal, one or both of the moveable gates can be retracted into hollow horizontal members 24. FIG. 17*b* also shows the locking bar 85 and locking tab 84 pivoted towards the bottom of the frame 41 which allows the frame 20 to be rotated around the base 40. These figures also illustrate the kick gates 131 in the closed position as controlled by the rotation activated mechanism 120 located on the bottom of the frame 20.

Figure 17D:
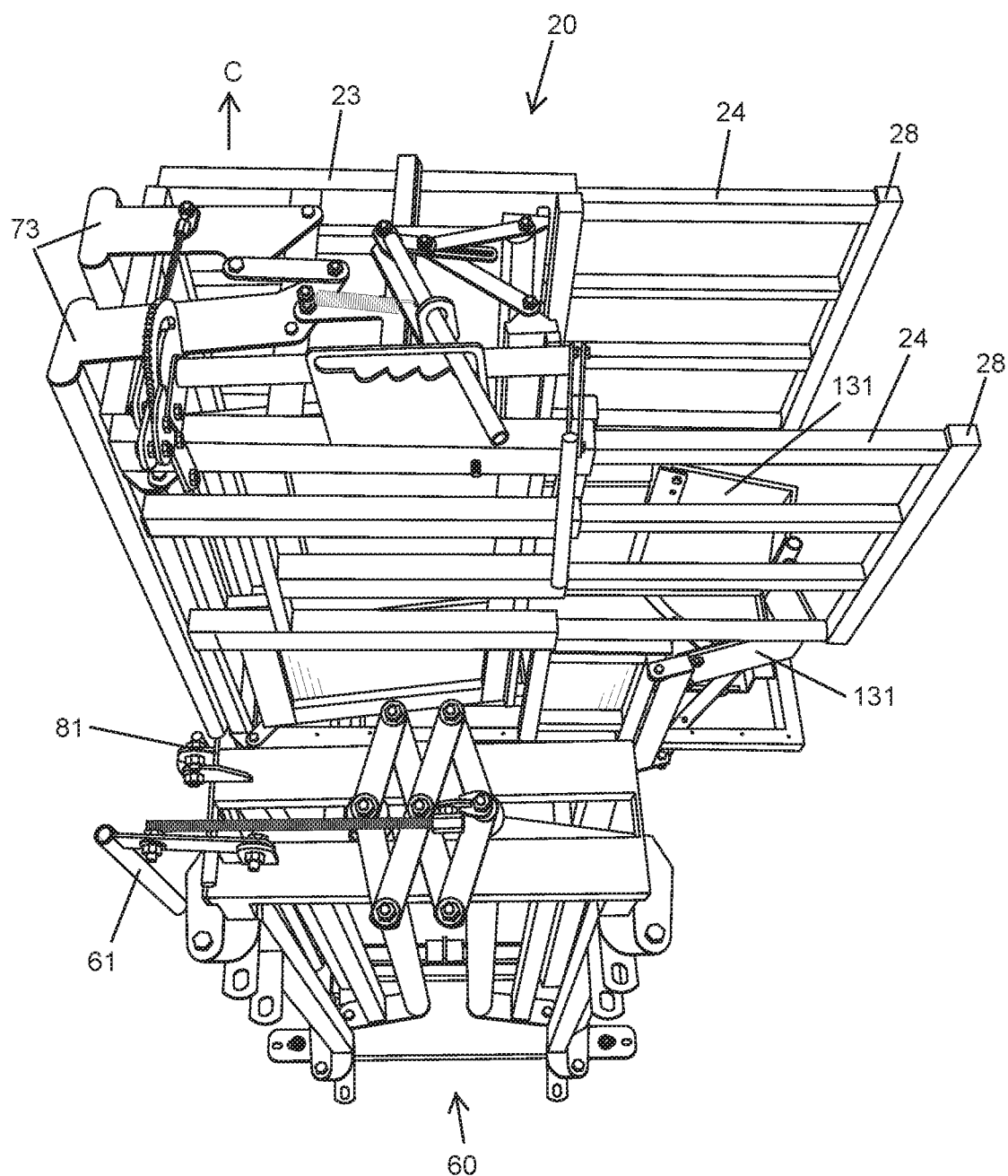

FIG. 17*d* shows the frame 20 now rotated into the second treatment position. The second treatment position allows the operator to perform any task associated with the front or head of the animal from the same position as the operator performed the tasks associated with the first treatment position. For example, the animal can be inoculated, branded, tagged, drenched, tattooed, de-horned and ear marked. Once the treatments have been completed the frame can now be rotated 90 degrees clockwise in the direction of arrow C to place the frame 20 in the neutral or start position. Before the frame 20 reaches the neutral or start position the latch 81 or foot pedal 94 are rotated upward to ensure that the locking tab 84 will be able to be relocated within the recess 89 between the locking gates 88 to secure the frame 20 to the base 40. As the frame 20 rotates around the base 40 towards the neutral or start position the rotation activated mechanism 120 located on the bottom of the frame 20 will automatically open the kick gates 131. Once the frame 20 has been returned to the neutral or start position the operator can then activate the exit gate handle 71 which starts the release process which will be described in further detail below.

Figure 18:
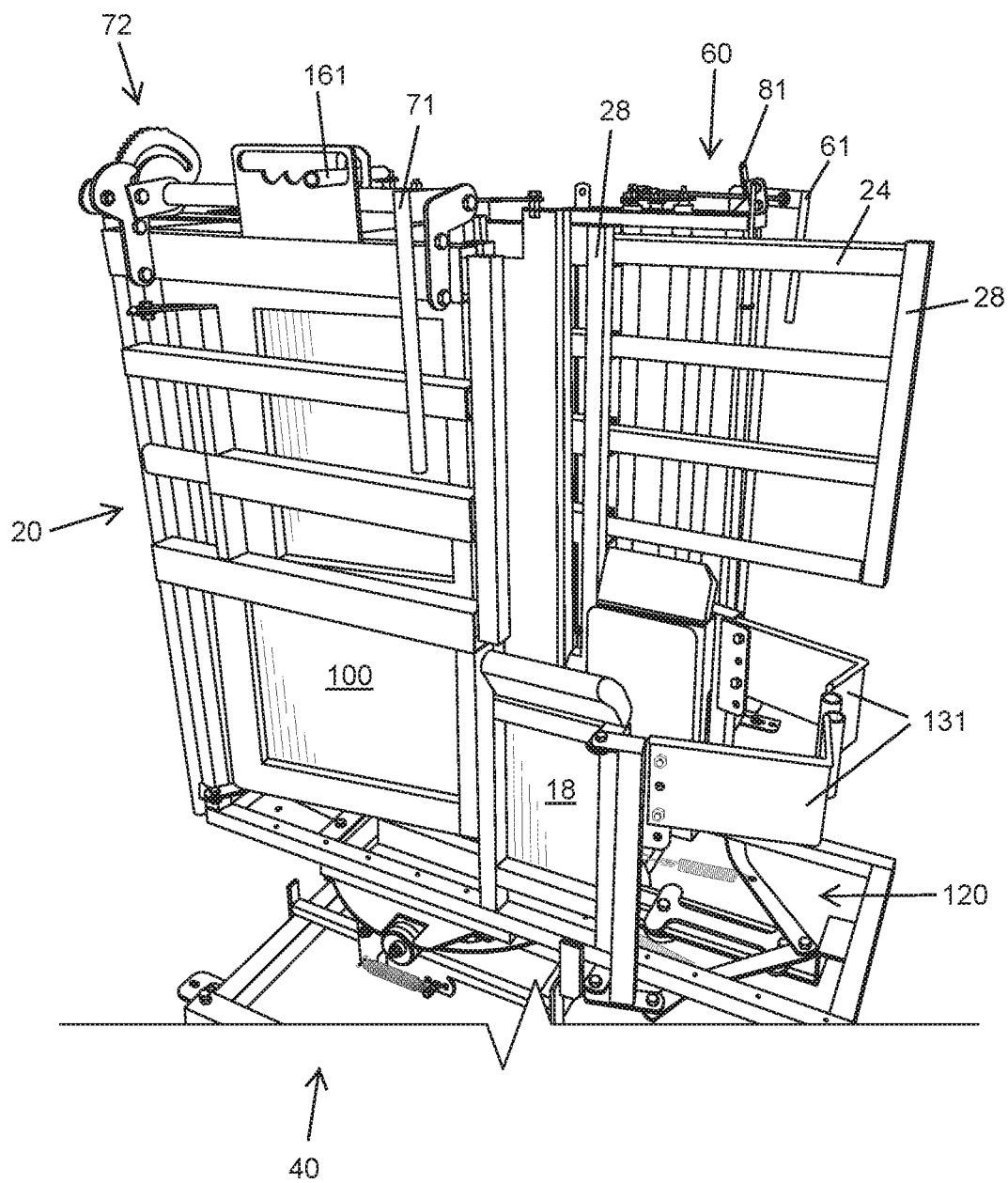
FIG. 18 shows the operation of the frame gates with one in an extended position and one retracted to allow an operator access within the frame of the apparatus.

As discussed above and as illustrated in FIG. 18 when the frame 20 is in the first treatment position an operator is able to push one or both moveable gates into the hollow horizontal members 24 to allow the operator better access to the rear of the animal. As shown in FIG. 18 one of the gates is pushed completely into the hollow horizontal members 24 and the other gate is in the fully extended position. Also shown in FIG. 18, the kick gates 131 and the lateral squeeze gates in the closed position as would be expected at the first treatment position.

The process involved in activating and releasing the respective components of the livestock handling apparatus 10 for confining and restraining livestock to facilitate their treatment will now be discussed.

Start a) The apparatus 10 is provided with the frame 20 positioned in the start or neutral position which allows an animal to enter the apparatus 10. The locking latch 81 is raised which positions the locking bar 85 and the locking tab 84 in the raised position effectively locking the frame 20 on the base 40.

b) The entrance gate 60 is opened by raising the operating handle 61 which moves the stanchions 63 apart to load the livestock into the frame 20. Once loaded the operating handle 61 is lowered to close the stanchions 63 behind the animal.

c) The exit gate 70 is then opened by raising the operating handle 71 which rotates the operating shaft 74 and opens the stanchions or head bale 73. This allows the head of the animal to pass through the pair of stanchions 73 which are then quickly closed by lowering the operating handle 71. This captures the neck of the animal between the ends of the stanchions 73.

d) The lateral restraining gate operating mechanism 160 is activated to move the free ends 102 of each lateral squeeze gate 100 against the ribs of the animal in the apparatus 10.

With the animal loaded into the livestock handling apparatus 10 the next step is to release the locking mechanism 80 to allow the frame 20 to rotate around the vertical axis 15 and about the base 40.

e) The locking latch 81 is lowered or the foot pedal 94 depressed which releases the locking tab 84 from between the locking gates 88 and allows the frame 20 to rotate freely in both clockwise and anti-clockwise directions on the base 40.

f) As the frame 20 begins to rotate clockwise towards the first treatment position the following actions occur:

i) The rotation activated mechanism 120 operates to close the kick gates 131. This includes the rotation of the roller 121 around the edge 51 of the planar platform 50 which moves the central carriage along the tracks 127. This activates the links 122 which rotate the column 110 and moves or pivots the link assembly 111.

ii) The kick gates 131 are directly attached to the column 110 and as the column 110 rotates the kick gates 131 move to the closed positon behind the rear legs of the animal.

g) With the frame 20 now located in the first treatment position all veterinary operations associated with the rear of the animal are performed by an operator.

h) The frame 20 is then rotated 180 degrees anti-clockwise to a second treatment position. As the frame 20 is rotated the operator is not required to move to the opposite side of the frame 20 to perform further treatments.

i) With the frame 20 in the second treatment position the operator can perform any veterinary operation associated with the front or head of the animal from the same side as the first treatment position.

j) Prior to the frame 20 being rotated to the start or neutral position the locking mechanism 80 needs to be reset. The locking latch 81 or foot pedal 94 is raised which positions the locking bar 85 and the locking tab 84 in the raised position which will effectively lock the frame 20 on the base 40 as the frame is rotated back to the start or neutral position. Also, as the frame 20 rotates around the base 40 towards the neutral or start position the rotation activated mechanism 120 located on the bottom of the frame 20 will automatically open the kick gates 131.

With all treatments completed the livestock handling apparatus 10 can be returned to the start or neutral position for the following release steps of the process.

Release a) With the frame 20 returned to the neutral or start position the release process is started with the operator raising the exit gate operating handle 71 from which the following actions occur simultaneously:

i) As the operating shaft 74 rotates the cam or operating shaft 167 is rotated into an activating position.

ii) The cam 167 raises the operating lever 161 from the linear ratchet mechanism 162, 163 and the spring 164 return the operating lever 161 to the start position and the free ends 102 of the squeeze gates 100 away from the ribs of the animal in the apparatus.

b) With the lateral squeeze gates 100 now released from the ribs of the animal and the kick gates 131 returned to the open position, the operator continues to rotate the operating lever 71 and the operating shaft 74 which opens the exit gate 70 to allow the release of the animal from the livestock handling apparatus 10.

c) The operator then lowers the exit gate operating handle 71 which rotates the operating shaft 74 and closes the exit gates 70.

The apparatus 10 is now ready for the next animal for treatment.

As described above the rotation of the frame 20 around the vertical axis 15 allows a single operator to perform treatment operations on both the front and rear of a confined and restrained animal from a single position. Alternatively, if speed of the treatment operation is required then two operators can simultaneously perform the respective animal treatments on the front and rear of the confined and restrained animal from opposing sides of the apparatus 10.

The frame 20 of the livestock handling apparatus 10 can be rotated around the vertical axis 15 in both clockwise and anti-clockwise directions. By way of example only, the device 10 will typically be positioned in the start or neutral position from which a lateral force is applied to the side of the frame 20 which allows the frame to be rotated clockwise 90 degrees to the first treatment position. The device can then be rotated anti-clockwise through 180 degrees to position the frame 20 in the second treatment position. Finally the device 10 and the frame 20 can be rotated 90 degrees clockwise to return the frame 20 to the start or neutral position.

The livestock handling apparatus 10 is manufactured from steel or like materials. The use of the device 10 for confining and restraining animals dictates that the apparatus 10 be able to withstand certain forces and therefore, the use of metal materials such as steel is preferred. The apparatus 10 has been predominantly developed for the confinement and restraining of calves, however it should be evident that other animals can also be confined and restrained by the present invention. For example, sheep, horses, goats, pigs or any other form of livestock can also be restrained and confined by the apparatus 10 in accordance with the present invention.

The livestock handling apparatus 10 has been implemented as a left-hand operating machine, the operating handles 61, 71, 81, 94 have all been positioned on the near side or left hand side of the animal and the apparatus 10. Alternatively, the handles 61, 71, 81, 94 could be positioned on the opposite side or right hand side of the livestock handling apparatus 10. This is sometimes required or desired for livestock handling equipment.

While the present invention has been implemented through the use of manual operating devices, such as the operating handles 61, 71, 81 and 94, it should also be evident that these operating devices could be implemented through the use of other automation. For example, hydraulic, pneumatic or electric/electronic devices could be incorporated in the apparatus 10 to provide for remote automated operation of the apparatus 10.

Furthermore, while certain treatments of the confined or restrained animals within the apparatus 10 have been described, other treatments or operations are also possible. For example, the apparatus 10 may further comprise an integrated weighing system to provide the opportunity to weigh and measure the animal while it is safely contained within the livestock handling apparatus 10. The apparatus 10 may also incorporate an electronic tag reader device for reading and recording the National Livestock Identification System (NLIS) identification number. During the animal treatment process of the head end of the animal an NLIS approved ear tag having a unique number including the Property Identification Code (PIC) are fitted with a microchip allowing them to be read by the electronic readers. This allows the animal to be tracked to improve livestock management.

The livestock handling apparatus 10 has been designed to be portable to enable the apparatus to be positioned on any flat ground in a paddock, shed or the like. The apparatus 10 has secure anchorage points 16 positioned on opposing sides of the base support frame 41 and adjacent the entrance gate assembly 60 and the exit gate assembly 70. While four anchorage points 16 are illustrated the apparatus may have multiple anchorage points 16 located around the base 40. As a further alternative and when the apparatus 10 is used in an environment where the apparatus is in a fixed position the livestock handling apparatus 10 can be permanently secured to a concrete platform or the like. In this position, the integrated weighing system would be placed under the device before permanently securing the apparatus 10 to the concrete platform.

ADVANTAGES

A number of advantages are apparent in the present invention. The present invention provides a livestock handling apparatus which is able to restrain and confine animals of different sizes and weights. The device has been constructed to provide no obstructions, nip or crush points and be effective, simple to operate and relatively quiet. The present invention has also been designed to assist the operator by presenting the animal to be treated at a level that minimizes the amount of bending and forward reaching by the operator during the treatment process. The device also ensures that the animal is well secured to minimize the potential of an operator being kicked or struck by the animal. In particular, kick gates are automatically rotated behind the animal's rear legs when the frame of the apparatus is rotated on the base. This protects an operator from being kicked by the animal especially when the operator is performing veterinary treatments at the rear of the animal.

Once an animal has entered and been confined and restrained in the apparatus, the operator is able to rotate the frame both clockwise and anti-clockwise. The rotation of the frame allows an operator to approach from directly behind the animal and does not have to work from the side. The operator is provided with a clear view of the treatment area and can work comfortably with either hand.

The present invention incorporates squeeze gates which close against the animal's ribs and stop it from being able to move sideways. The operating mechanism controls the movement of the squeeze gates so that the sides will fit snugly against big animals and also adjust to smaller animals. With different sized animals one of the main differences is the actual width of the animal and the ability to move the free ends of the squeeze gates allows the apparatus to capture different animal widths. The operator is also able to provide additional force on the squeeze gate by moving the operating handle in the ratchet mechanism to further constrain the animal. Cattle are a herd animal and if separated they become agitated very quickly. The pressure on their sides provided by the squeeze gates tends to simulate the pressing of other animals in the yards and has a quietening effect as well as making the operator's job easier.

The frame of the device has been provided with a pair of sliding gates which one or both can be slid into the hollow horizontal members to allow the operator access for such treatments as branding. The sliding gates also help to provide easy access to behind the animal and not from the side of the animal. One or both gates can be slideably opened or closed for easy access to the rear of the animal.

The present invention provides an apparatus which provides improved safety for the operator and simplifies the handling of animals for ear tagging, de-horning, vaccination, castration, branding and many other husbandry practices all from a single location. This rotation of the apparatus allows a single operator to set-up for all treatments for both the front and rear of the animal in a single location. For example, the rotation moves the frame into a position which gives the operator easy, safe access to the head and/or tail end of the animal contained therein.

Another advantage of the present invention is that once the frame has been rotated through 90 degrees and both ends of the animal have been exposed an operator can easily access an animal with either hand. Therefore, the livestock handling apparatus can easily cater for both right-handed and left-handed operators.

VARIATIONS

It will be realized that the foregoing has been given by way of illustrative example only and that all other modifications and variations as would be apparent to persons skilled in the art are deemed to fall within the broad scope and ambit of the invention as herein set forth.

As used herein the term "and/or" means "and" or "or", or both.

As used herein "(s)" following a noun means the plural and/or singular forms of the noun.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. A livestock handling apparatus for confining and restraining livestock to facilitate their treatment, the apparatus comprising:
   an animal-receiving stall having a frame, a base and a means for rotatably mounting the frame on the base, the animal receiving stall having opposed, entrance and exit openings the means for rotatably mounting the frame on the base comprises:
- a first platform mounted on the base and having a planar top surface with a central aperture therein;
- a shaft vertically mounted on the base and extending through the central aperture in the first platform; and
- a turntable mounted on an underside of the support member of the frame, the turntable has an aperture for receiving the vertically mounted shaft and the turntable is rotatably supported above the first platform to allow the frame to rotate around a vertical axis about the shaft on the base; and an entrance gate assembly located at the entrance opening and fixed to one end of the base;

an exit gate assembly located at the exit opening and attached to rotate with the frame around the base at one end of the frame, the exit gate assembly having a pair of stanchions which are adapted to capture a neck of an animal therebetween;

wherein the means for rotatably mounting the frame to the base allows rotation of the frame in both clockwise and counter clockwise directions around the vertical axis to position an animal in a selected treatment position.

2. A livestock handling apparatus as claimed in claim 1, wherein the frame comprises normally upright members mounted on a support member, the support member forming a planar floor allowing the animal to stand on the floor when received therein, the upright members forming a first side spaced apart from a second side, the first and second sides having a plurality of horizontally disposed first and second elongate members.

3. A livestock handling apparatus as claimed in claim 2, wherein the second elongate members are slideably received within the first elongate members and moveable between extended and retracted positions, and one or both of the first or second side second elongate members can be retracted to allow a user access to a rear of the animal within the animal receiving stall.

4. A livestock handling apparatus as claimed in claim 2, wherein the animal receiving stall further comprises a pair of lateral restraining assemblies, one of the pair of lateral restraining assemblies is located at or adjacent each of the first and the second sides of the upright members of the frame and located between the entrance and exit openings, the assemblies being supported for movement relative to the frame so as to be movable towards and away from one another for constraining the animal laterally.

5. A livestock handling apparatus as claimed in claim 4, wherein the pair of lateral restraining assemblies comprise a first end pivotally connected to an upright frame member and located adjacent the exit opening and a second free end connected to a control mechanism, wherein upon activation by a control lever, the free ends move towards the animal to be restrained, and are adapted to contact adjacent an animals ribs to assist in immobilizing the animal within the frame.

6. A livestock handling apparatus as claimed in claim 5, wherein the control lever is mounted to be movable within a linear ratchet mechanism, the control lever is adapted to allow each free end of the pair of lateral restraining assemblies to move from a first position adjacent the first and second sides of the upright members of the frame to one of a second position retained against the animals ribs, the position of the control lever within the linear ratchet mechanism allows the free ends of the lateral restraining assemblies to be positioned to accommodate different sized animals in the frame, and upon rotation of the operating shaft by a user moving the operating handle of the exit gate assembly, the at least one activating cam on the outer surface of the operating shaft is positioned to contact the control lever to disengage the control lever from the linear ratchet mechanism to release the lateral restraining assemblies from the animal and return each free end of the pair of lateral restraining assemblies to the first position adjacent the first and second sides of the upright members of the frame.

7. A livestock handling apparatus as claimed in claim 5, wherein the shaft is a threaded axle vertically mounted to the base, and the turntable is rotatably mounted above the first platform for rotation about the shaft.

8. A livestock handling apparatus as claimed in claim 7, wherein the turntable is rotatably supported above the first platform by means of at least one pair of support wheels rotatably mounted on the first platform, each pair of support wheels being located on collinear axes extending from opposite sides of the shaft, and each support wheel is mounted for rotation within a longitudinal channel in the planar top surface of the first platform, each longitudinal channel being located around the periphery of the first platform, each support wheel projects above and below the planar top surface of the first platform and an outer surface of the support wheel contacts the turntable, for guiding movement of the frame during rotation around the vertical axis.

9. A livestock handling apparatus as claimed in claim 8, wherein the turntable comprises a first recess and a second recess located on diametrically opposite sides on an outer edge of the turntable, and the base comprises an engaging mechanism which engages one of the first or second recesses in the turntable to enable the frame to be positioned in and movable between one of two selected treatment positions, and the engaging mechanism comprises a recess engaging wheel and a tensioning device, the recess engaging wheel releasably engages the first or second recess to arrest rotation of the frame on the base and the tensioning device applies a force to the recess engaging wheel to maintain the wheel within the first or second recess, and a lateral force applied to the frame of the apparatus will allow the frame to rotate around the vertical axis and allow the recess engaging wheel to be released from the first or second recess.

10. A livestock handling apparatus as claimed in claim 2, wherein the apparatus further comprises a pair of kick gates, each kick gate is located at or adjacent a lower rear end of each of the first and the second sides of the upright members of the frame, the kick gates are attached to a rotating vertical column and movable between an open position and a closed position, when in the closed position the kick gates protect the user from being kicked by the animal.

11. A livestock handling apparatus as claimed in claim 10, wherein the apparatus further comprises a rotation activated mechanism connected to each rotating vertical column, the rotation activated mechanism comprises:
- a central activating carriage having a first end spaced apart from a second end, the central activating carriage mounted for lateral movement along a first side of a pair of rails, wherein the pair of rails are mounted to the frame support member and spaced apart to form a slot between the rails;
- a roller connected to the first end of the central activating carriage and located on a second side of the pair of rails, wherein the roller is connected to the central activating carriage through the slot formed between the rails;

a pair of link assemblies having a first end connected to each rotating vertical column and a second end connected to the second end of the central activating carriage; and wherein when the lateral force is applied to the frame, rotation of the frame around the vertical axis engages the roller into contact with an edge surface of the first platform on the base of the apparatus, the first platform having a shape which moves the roller and the central activating carriage laterally along the rails to drive the link assemblies and the rotating vertical column to close the kick gates; and wherein the pair of link assemblies further comprise a return spring for biasing the rotation activated mechanism to a first position when the frame has been positioned on the base to allow the kick gates to open and the animal to enter or leave the animal receiving stall.

12. A livestock handling apparatus as claimed in claim 11, wherein the operating handle of the exit gate assembly, an operating handle for the entrance gate, the remote operating mechanism of the first locking mechanism and the control lever for the pair of lateral restraining assemblies are remotely operable by a plurality of remote operating devices from a location in close proximity to one side of the frame to permit manipulation of the gates and rotation of the frame by a single operator from the location.

13. A livestock handling apparatus as claimed in claim 12, wherein the livestock to be confined and restrained is any one of cattle or a calf, a horse, a sheep, a goat, a pig or any other form of livestock.

14. A livestock handling apparatus as claimed in claim 13, wherein the selected treatment positions which the frame is movable between comprises a first treatment position which allows an operator to perform any task associated with the rear or the animal and a second treatment position which allows the operator to perform any task associated with the front or head of the animal, and the rotation of the animal receiving frame allows the operator to perform veterinary operations in both the first and second treatment positions from one side of the livestock handling apparatus.

15. A livestock handling apparatus as claimed in claim 1, wherein the livestock handling apparatus further comprises a first locking mechanism for securing the frame and the base in a position to allow the animal to enter or leave the animal receiving stall.

16. A livestock handling apparatus as claimed in claim 15, wherein the first locking mechanism comprises:

a locking bar having a first end pivotally attached to the base;

a pair of locking gates, each locking gate having a first end and a spaced apart second end, the first end of each gate is pivotally mounted to a bottom surface of the frame support member; and a remote operating mechanism for releasing the locking bar from between 10 a recess formed between opposing second ends of the locking gates, the remote operating mechanism being connected to a second end of the locking bar.

17. A livestock handling apparatus as claimed in claim 16, wherein the locking bar has a locking tab extending upwardly from a surface of the locking bar, the locking tab being located between the recess formed at opposing ends of the locking gates for securing the frame and the base in the position to allow the animal to enter or leave the animal receiving stall, and the remote operating mechanism comprises a latch assembly attached adjacent an upper corner of the entrance gate and a foot pedal attached adjacent a lower corner of the entrance gate with both attached to the locking bar by an activation rod.

18. A livestock handling apparatus as claimed in claim 17, wherein when the latch assembly or the foot pedal is remotely activated or placed in a lowered position the activation rod extends vertically downward to rotate the locking bar about the first end pivot and the locking tab is pivoted away from the recess between the locking gates to allow the frame to be rotated on the base, and to return the frame and the base to the position to allow the animal to enter or leave the animal receiving stall, the latch assembly or the foot pedal is raised and the activation rod is vertically raised to allow the locking tab to be relocated between the recess formed at opposing ends of the locking gates, wherein as the frame is rotated a top surface of the locking tab engages with a bottom surface on one of the pair of locking gates and rotates the locking gate about the first end pivot until the locking tab is relocated within the recess between the opposing ends of the locking gates to lock the frame to the base.

19. A livestock handling apparatus as claimed in claim 1, wherein the pair of stanchions are a pair of side-by-side stanchions and the exit gate assembly further comprises a head gate with the pair of side-by-side stanchions with an operating mechanism connecting the pair of side-by-side stanchions to an operating shaft, and an operating handle in communication with the operating shaft, to open and close the pair of side-by-side stanchions, the operating shaft is a longitudinally extending tubular member with at least one activating cam mounted on an outer surface of the operating shaft, and upon rotation of the operating shaft by a user moving the operating handle, the at least one activating cam is positioned to contact an associated activating member.

* * * * *